United States Patent
Sinha

(10) Patent No.: US 12,229,658 B2
(45) Date of Patent: Feb. 18, 2025

(54) CONFIGURABLE PROCESSOR FOR IMPLEMENTING CONVOLUTION NEURAL NETWORKS

(71) Applicant: Pavel Sinha, Brossard (CA)

(72) Inventor: Pavel Sinha, Brossard (CA)

(73) Assignee: AARISH TECHNOLOGIES, Brossard (CA)

( * ) Notice: Subject to any disclaimer, the term of this patent is extended or adjusted under 35 U.S.C. 154(b) by 702 days.

(21) Appl. No.: 16/933,859

(22) Filed: Jul. 20, 2020

(65) Prior Publication Data
US 2021/0034958 A1 Feb. 4, 2021

Related U.S. Application Data

(60) Provisional application No. 63/025,580, filed on May 15, 2020, provisional application No. 62/941,646, (Continued)

(51) Int. Cl.
G06N 3/063 (2023.01)
G06N 3/04 (2023.01)
G06N 3/08 (2023.01)

(52) U.S. Cl.
CPC .............. *G06N 3/063* (2013.01); *G06N 3/04* (2013.01); *G06N 3/08* (2013.01)

(58) Field of Classification Search
CPC ............ G06N 3/063; G06N 3/04; G06N 3/08; G06N 3/045; G06N 3/084
See application file for complete search history.

(56) References Cited

U.S. PATENT DOCUMENTS 10,331,983 B1 * 6/2019 Yang .................. G06N 3/04
2011/0206381 A1 8/2011 Ji et al.
(Continued)

FOREIGN PATENT DOCUMENTS

| JP | 2013008221 A | 1/2013 |
| JP | 2019003414 A | 1/2019 |
| WO | 2018193370 A1 | 10/2018 |

OTHER PUBLICATIONS

Pham, Phi-Hung, et al. "NeuFlow: Dataflow vision processing system-on-a-chip." 2012 IEEE 55th International Midwest Symposium on Circuits and Systems (MWSCAS). IEEE, 2012. (Year: 2012).*

(Continued)

*Primary Examiner* — Vincent Gonzales
*Assistant Examiner* — Sidney Vincent Bostwick
(74) *Attorney, Agent, or Firm* — Gabriel Fitch; LOZA & LOZA, LLP

(57) ABSTRACT

Configurable processors for implementing CNNs are provided. One such configurable CNN processor includes a plurality of core compute circuitry elements, each configured to perform a CNN function in accordance with a preselected dataflow graph, an active memory buffer, a plurality of connections between the active memory buffer and the plurality of core compute circuitry elements, each established in accordance with the preselected dataflow graph, a plurality of connections between the plurality of core compute circuitry elements, each established in accordance with the preselected dataflow graph, wherein the active memory buffer is configured to move data between the plurality of core compute circuitry elements via the active memory buffer in accordance with the preselected dataflow graph.

39 Claims, 32 Drawing Sheets

Related U.S. Application Data filed on Nov. 27, 2019, provisional application No. 62/876,219, filed on Jul. 19, 2019.

(56) References Cited

U.S. PATENT DOCUMENTS

| | | | |
|---|---|---|---|
| 2014/0180989 A1 | 6/2014 | Krizhevsky et al. | |
| 2019/0205737 A1* | 7/2019 | Bleiweiss | G06N 3/063 |
| 2020/0272779 A1* | 8/2020 | Boesch | G06F 30/327 |

OTHER PUBLICATIONS

Di Febbo, Paolo, et al. "Kcnn: Extremely-efficient hardware keypoint detection with a compact convolutional neural network." Proceedings of the IEEE conference on computer vision and pattern recognition workshops. 2018. (Year: 2018).*

Frenger, Paul. "The Ultimate RISC: A zero-instruction computer." ACM Sigplan Notices 35.2 (2000): 17-24. (Year: 2000).*

Pinkevich, V. Yu, A. E. Platunov, and A. V. Penskoi. "The approach to design of problem-oriented reconfigurable hardware computational units." 2020 Wave Electronics and its Application in Information and Telecommunication Systems (WECONF). IEEE, 2020. (Year: 2020).*

Krizhevsky, Alex et al., "ImageNet Classification with Deep Convolutional Neural Networks", Advances in Neural Information Processing Systems; 2012; https://proceedings.neurips.cc/paper/2012/file/c399862d3b9d6b76c8436e924a68c45b-Paper.pdf; 9 pages.

Long, Jonathan et al., "Fully Convolutional Networks for Semantic Segmentation", Cornell University; Computer Science: Computer Vision and Pattern Recognition; Nov. 14, 2014; https://arxiv.org/abs/1411.4038; 10 pages.

Vinyals, Oriol et al., "Show and Tell: A Neural Image Caption Generator", Cornell University; Computer Science: Computer Vision and Pattern Recognition; Nov. 17, 2014; https://arxiv.org/abs/1411.4555; 9 pages.

Toshev, Alexander et al., "DeepPose: Human Pose Estimation via Deep Neural Networks", Cornell University; Computer Science: Computer Vision and Pattern Recognition; Dec. 17, 2013; https://arxiv.org/abs/1312.4659; 9 pages.

Lecun, Yann et al., "Gradient-Based Learning Applied to Document Recognition", Proceedings of the IEEE; vol. 36, Issue 11; Nov. 1998; https://ieeexplore.ieee.org/document/726791; 46 pages.

Zeiler, Matthew D. et al., "Visualizing and Understanding Convolutional Networks", Cornell University; Computer Science: Computer Vision and Pattern Recognition; Nov. 12, 2013; https://arxiv.org/abs/1311.2901; 11 pages.

Simonyan, Karen et al., "Very Deep Convolutional Networks for Large-Scale Image Recognition", Cornell University; Computer Science: Computer Vision and Pattern Recognition; Sep. 4, 2014; https://arxiv.org/abs/1409.1556; 14 pages.

Szegedy, Christian et al., "Going Deeper with Convolutions", Cornell University; Computer Science: Computer Vision and Pattern Recognition; Sep. 17, 2014; https://arxiv.org/abs/1409.4842; 12 pages.

He, Kaiming et al., "Deep Residual Learning for Image Recognition", Cornell University; Computer Science: Computer Vision and Pattern Recognition; Dec. 10, 2015; https://arxiv.org/abs/1512.03385; 12 pages.

Jaderberg, Max et al., "Spatial Transformer Networks", Cornell University; Computer Science: Computer Vision and Pattern Recognition; Jun. 5, 2015; https://arxiv.org/abs/1506.02025; 15 pages.

Szegedy, Christian et al., "Going Deeper with Convolutions", 2015 IEEE Conference on Computer Vision and Pattern Recognition; 2015; https://doi.ieeecomputersociety.org/10.1109/CVPR.2015.7298594; 9 pages.

He, Kaiming et al., "Spatial Pyramid Pooling in Deep Convolutional Networks for Visual Recognition", IEEE Transactions on Pattern Analysis and Machine Intelligence; vol. 37, Issue 9; Sep. 1, 2015; https://ieeexplore.ieee.org/document/7005506; 14 pages.

Iandola, Forrest N. et al., "SqueezeNet: AlexNet-Level Accuracy with 50x Fewer Parameters and <0.5MB Model Size", Cornell University; Computer Science: Computer Vision and Pattern Recognition; Feb. 24, 2016; https://arxiv.org/abs/1602.07360; 13 pages.

Wan, Lihong et al., "Face Recognition with Convolutional Neural Networks and Subspace Learning", 2017 2nd International Conference on Image, Vision and Computing; Jun. 2-4, 2017; https://ieeexplore.ieee.org/document/7984551; 6 pages.

Canziani, Alfredo et al., "An Analysis of Deep Neural Network Models for Practical Applications", Cornell University; Computer Science: Computer Vision and Pattern Recognition; May 24, 2016; https://arxiv.org/abs/1605.07678; 7 pages.

Strigl, Daniel et al., "Performance and Scalability of GPU-based Convolutional Neural Networks", 2010 18th Euromicro Conference on Parallel, Distributed & Network-based Processing; Feb. 17-19, 2010; https://ieeexplore.ieee.org/document/5452452; 8 pages.

Ovtcharov, Kalin et al., "Accelerating Deep Convolutional Neural Networks Using Specialized Hardware", Microsoft Research; Feb. 22, 2015; https://www.microsoft.com/en-us/research/wp-content/uploads/2016/02/CNN20Whitepaper.pdf; 4 pages.

Andri, Renzo et al., "YodaNN: An Ultra-Low Power Convolutional Neural Network Accelerator Based on Binary Weights", 2016 IEEE Computer Society Annual Symposium on VLSI; Jul. 11-13, 2016; https://ieeexplore.ieee.org/document/7560203; 6 pages.

Jafri, Syed M. A. H. et al., "Can a Reconfigurable Architecture Beat ASIC as a CNN Accelerator?", 2017 International Conference on Embedded Computer Systems: Architectures, Modeling, and Simulation; Jul. 17-20, 2017; https://ieeexplore.ieee.org/abstract/document/8344616; 8 pages.

Jouppi, Norman P. et al., "In-Datacenter Performance Analysis of a Tensor Processing Unit", Cornell University; Computer Science: Hardware Architecture; Apr. 16, 2017; https://arxiv.org/abs/1704.04760; 17 pages.

Courbariaux, Matthieu et al., "BinaryConnect: Training Deep Neural Networks with Binary Weights During Propagations", Cornell University; Computer Science: Machine Learning; Nov. 2, 2015; https://arxiv.org/abs/1511.00363?context=cs; 9 pages.

Rastegari, Mohammad et al., "XNOR-Net: ImageNet Classification Using Binary Convolutional Neural Networks", Cornell University; Computer Science: Computer Vision and Pattern Recognition; Mar. 16, 2016; https://arxiv.org/abs/1603.05279; 17 pages.

Zhou, Shuchang et al., "DoReFa-Net: Training Low Bitwidth Convolutional Neural Networks with Low Bitwidth Gradients", Cornell University; Computer Science: Neural and Evolutionary Computing; Jun. 20, 2016; https://arxiv.org/abs/1606.06160; 13 pages.

Hubara, Itay et al., Quantized Neural Networks: Training Neural Networks with Low Precision Weights and Activations; Cornell University; Computer Science: Neural and Evolutionary Computing; Sep. 22, 2016; https://arxiv.org/abs/1609.07061; 29 pages.

Lin, Darryl D. et al., "Fixed Point Quantization of Deep Convolutional Networks", Cornell University; Computer Science: Machine Learning; Nov. 19, 2015; https://arxiv.org/abs/1511.06393?context=cs; 10 pages.

Mishra, Asit et al., "WRPN:Wide Reduced-Precision Networks", Cornell University; Computer Science: Computer Vision and Pattern Recognition; Sep. 4, 2017; https://arxiv.org/abs/1709.01134; 11 pages.

Chen, Yu-Hsin et al., "Eyeriss: An Energy-Efficient Reconfigurable Accelerator for Deep Convolutional Neural Networks", IEEE Journal of Solid-State Circuits; vol. 52, Issue 1; Jan. 2017; https://ieeexplore.ieee.org/document/7738524; 12 pages.

Moons, Bert et al., "A 0.3-2.6 TOPS/W Precision-Scalable Processor for Real-Time Large-Scale ConvNets", Cornell University; Computer Science: Hardware Architecture; Jun. 16, 2016; https://arxiv.org/pdf/1606.05094.pdf; 2 pages.

Moons, Bert et al., "14.5 Envision: A 0.26-to-10TOPS/W subword-parallel dynamic-voltage-accuracy-frequency-scalable Convolutional Neural Network processor in 28nm FDSOI", 2017 IEEE International Solid-State Circuits Conference; Feb. 2017; https://www.researchgate.net/publication/314297052_145_Envision_A_026-to-10TOPSW_subword-parallel_dynamic-voltage-accuracy-frequency-scalable_Convolutional_Neural_Network_processor_in_28nm_FDSOI; 5 pages.

(56) References Cited

OTHER PUBLICATIONS

Aimar, Alessandro et al., "NullHop: A Flexible Convolutional Neural Network Accelerator Based on Sparse Representations of Feature Maps", Cornell University; Computer Science: Computer Vision and Pattern Recognition; Jun. 5, 2017; https://arxiv.org/abs/1706.01406; 13 pages.

Groq, Inc., "Open Platform. Performance without Lock-In.", Jan. 4, 2019; Last accessed Dec. 14, 2022 via Wayback Machine; https://web.archive.org/web/20190104174009/https://groq.com/; 2 pages (Website).

Sun, Baohua et al., "Ultra Power-Efficient CNN Domain Specific Accelerator with 9.3TOPS/Watt for Mobile and Embedded Applications", Cornell University; Computer Science: Computer Vision and Pattern Recognition; Apr. 30, 2018; https://arxiv.org/abs/1805.00361; 9 pages.

Dennis, Jack B. et al., "An Efficient Pipelined Dataflow Processor Architecture", Supercomputing '88:Proceedings of the 1988 ACM/IEEE Conference on Supercomputing, vol. I; Nov. 14-18, 1988; https://ieeexplore.ieee.org/document/44674; 6 pages.

International Search Report and Written Opinion for International Application No. PCT/IB2020/000609, dated Nov. 4, 2020, 13 pages.

Pham, Phi-Hung et al., "NeuFlow: Dataflow Vision Processing System-on-a-Chip"; 2012 IEEE 55th International Midwest Symposium on Circuits and Systems; 2012; https://ieeexplore.ieee.org/document/6292202; 4 pages.

Desoli, Giuseppe et al., "A 2.9TOPS/W Deep Convolutional Neural Network SoC in FD-SOI 28nm for Intelligent Embedded Systems"; 2017 IEEE International Solid-State Circuits Conference; 2017; https://ieeexplore.ieee.org/document/7870349; 3 pages.

\* cited by examiner

CONFIGURABLE PROCESSOR FOR IMPLEMENTING CONVOLUTION NEURAL NETWORKS

CROSS-REFERENCE TO RELATED APPLICATION(S)

This application claims priority to and the benefit of U.S. Provisional Application No. 63/025,580 filed on May 15, 2020, and entitled, "Direct Conversion of Raw Image Sensor Input (Bayer-Pattern) to Image/Video Analytics using a Single CNN," U.S. Provisional Application No. 62/941,646 filed on Nov. 27, 2019, and entitled, "Direct Conversion of Raw Image Sensor Input (Bayer-Pattern) to Image/Video Analytics using a Single CNN," and U.S. Provisional Application No. 62/876,219 filed on Jul. 19, 2019, and entitled, "Programmable Functional Array (PFA) Processor for CNNs," the entire content of each of which is incorporated herein by reference.

FIELD

The subject matter described herein generally relates to machine learning and convolutional neural networks (CNNs). More particularly, the subject matter described herein relates to a configurable processor for implementing CNNs.

INTRODUCTION

Deep learning, which may also be referred to as deep structured learning or hierarchical learning is part of a broader family of machine learning methods based on artificial neural networks. Learning can be supervised, semi-supervised or unsupervised. Deep learning architectures such as deep neural networks, deep belief networks, recurrent neural networks and convolutional neural networks (CNNs) have been applied to a number of fields, including image classification and natural language processing, where they have produced results comparable to human experts. For example, deep learning has resulted in state-of-the-art performance in image recognition and vision tasks such as object recognition, semantic segmentation, image captioning, human pose estimation and more. Most of these achievements can be attributed to the use of CNNs capable of learning complex hierarchical feature representation.

With the increase in complexity of CNNs, hardware requirements pose challenges to the state-of-the-art implementation. Practical limits on resources such as memory, computation, and consumed power have hindered the exploration of very deep and efficient neural networks. Common approaches to accelerate computation of CNNs used today may involve using graphical processing units (GPUs) and even custom hardware solutions.

A 2015 article from Microsoft Research focused on using specialized hardware to accelerating deep convolutional neural networks. A 2016 article presented a binary-weight based ultra-low power convolutional neural network accelerator called YodaNN. A 2017 article described a re-configurable architecture that reportedly beat CNN accelerators claiming 2.2× (e.g., 2.2 times) higher throughput, 2.3× better energy efficiency, and 26-35% lowered use of chip area. CNNs are trained, typically using backpropagation, to produce the correct output for a set of labeled examples. The network training is usually done on hardware platforms such as graphical processing units (GPUs) or highly-specialized server oriented architectures.

Inference in state-of-art (SOA) trained CNNs is computationally expensive, typically using several billion multiply-accumulate (MAC) operations per image. Using a mobile processor or mobile GPU to run inference on a CNN can become prohibitively expensive in a power-constrained mobile platform. For example, it is reported that the NVIDIA Tegra X1 GPU platform, which targets mobile automatic driver assistance (ADAS) applications, can process 640×360 color input frames at a rate of 15 Hertz (Hz) through a computationally efficient semantic segmentation CNN. Processing each frame through this CNN thus appears to require about 2 billion MAC operations. Thus, the GPU does around 60 billion (Giga) operations per second (GOps/s), at a power consumption of about 10 Watts (W). Therefore, at the application level, this GPU achieves a power efficiency of about 6 GOps/W, which is only about 6% of its theoretical maximum performance. As a result, the NVIDIA solution can process a CNN at only 30 frames per second (FPS) if the network requires less than 2 GOps/frame.

An important development in CNN research relevant to hardware accelerators is use of methods for training CNNs that use low precision weights, activation, and sometimes back propagated gradients. Training a network which uses low precision parameters and the rectified linear unit (ReLU) activation function may lead up to 50% increased sparsity in the activations. Sparse networks can be beneficial for minimizing computations and memory access during inference. Several reported dedicated accelerators already exploit this sparsity. For example, a CNN hardware accelerator called NullHop exploits activation sparsity. A power optimized implementation of CNN inference accelerator from Groq has a reported power consumption of 8 tera operations per second (TOPS) per Watt, which is very efficient. Another efficient CNN inference accelerator reportedly has a power consumption of 9.3 TOPS/W from Gyrfalcon technology.

The above described approaches to CNN processors or accelerators however suffer from one or more deficiencies. For example, many use an architecture that requires the use of external memory. Also, each of the above described approaches uses an architecture that does not cater to real-time requirements, and/or is not well suited to CNN architectures. As a result, there exists a need for an improved CNN processor that addresses these shortcomings.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides a configurable processor dedicated to implementing convolution neural networks (CNNs), comprising: a plurality of core compute circuitry elements, each configured to perform a CNN function in accordance with a preselected dataflow graph; an active memory buffer; a plurality of connections between the active memory buffer and the plurality of core compute circuitry elements, each established in accordance with the preselected dataflow graph; and a plurality of connections between the plurality of core compute circuitry elements, each established in accordance with the preselected dataflow graph, wherein the active memory buffer is configured to move data between the plurality of core compute circuitry elements via the active memory buffer in accordance with the preselected dataflow graph.

In one aspect, the preselected dataflow graph is based on a preselected CNN.

In one aspect, each of the plurality of core compute circuitry elements is configured to perform the CNN function in accordance with the preselected dataflow graph and without using an instruction set.

In one aspect, at least two of the plurality of core compute circuitry elements are configured to operate asynchronously from one another.

In one aspect, the active memory buffer and each of the plurality of core compute circuitry elements are configured to operate asynchronously from one another.

In one aspect, each of the plurality of core compute circuitry elements is dedicated to performing the CNN function.

In one aspect, each of the plurality of core compute circuitry elements is configured, prior to a runtime of the configurable processor, to perform the CNN function.

In one aspect, each of the plurality of core compute circuitry elements is configured to compute a layer of the CNN function.

In one aspect, each of the plurality of core compute circuitry elements is configured to compute an entire CNN.

In one aspect, each of the plurality of core compute circuitry elements is configured to perform the CNN function for both inference and training.

In one aspect, each of the plurality of core compute circuitry elements comprises a memory configured to store a weight used to perform the CNN function.

In one aspect, the plurality of connections between the active memory buffer and the plurality of core compute circuitry elements are established during a compile time and fixed during a runtime of the configurable processor; and the plurality of connections between the plurality of core compute circuitry elements are established during the compile time and fixed during the runtime.

In one aspect, the disclosure further provides a processor array, comprising: a plurality of the configurable processors as described above; an interconnect circuitry; and a plurality of connections between the plurality of configurable processors and/or the interconnect circuitry, each established in accordance with the preselected dataflow graph.

In one aspect, the disclosure further provides a system comprising: a mobile industry processor interface (MIPI) source; a MIPI sink; a MIPI bus coupled between the MIPI source and the MIPI sink; and the configurable processor, as described above, disposed serially along the MIPI bus such that all data on the MIPI bus passes through the configurable processor.

In one aspect, the system further comprising: a non-MIPI output interface comprising at least one of a SPI, an I2C interface, or a UART interface; and wherein the configurable processor is configured to send information to an external device using either the non-MIPI output interface or the MIPI bus.

In one aspect, the disclosure further provides a system comprising: a sensor configured to generate sensor data; the configurable processor, as described above, directly coupled to the sensor and configured to generate processed data based on the sensor data; and a wireless transmitter directly coupled to the configurable processor and configured to transmit at least a portion of the processed data. In one aspect, the sensor data comprises image data; the processed data comprises classification data generated based on the image data; and the wireless transmitter is configured to transmit the classification data.

In one aspect, the disclosure further provides a method for configuring a configurable processor dedicated to implementing convolution neural networks (CNNs), comprising: receiving a preselected dataflow graph; programming each of a plurality of core compute circuitry elements to perform a CNN function in accordance with the preselected dataflow graph; programming an active memory buffer in accordance with the preselected dataflow graph; programming a plurality of connections between the active memory buffer and the plurality of core compute circuitry elements in accordance with the preselected dataflow graph; programming a plurality of connections between the plurality of core compute circuitry elements in accordance with the preselected dataflow graph; and programming the active memory buffer to move data between the plurality of core compute circuitry elements via the memory buffer in accordance with the preselected dataflow graph.

In one aspect, each of the programming activities is performed prior to a runtime of the configurable processor.

In one aspect, the method further comprises operating the plurality of core compute circuitry elements to perform the CNN function without using an instruction set; and operating the active memory buffer without using an instruction set.

In one aspect, the preselected dataflow graph is based on a preselected CNN.

In one aspect, the method further comprises operating at least two of the plurality of core compute circuitry elements asynchronously from one another.

In one aspect, the method further comprises operating the active memory buffer and each of the plurality of core compute circuitry elements asynchronously from one another.

In one aspect, each of the plurality of core compute circuitry elements is dedicated to performing the CNN function.

In one aspect, the method further comprises performing, during a runtime of the configurable processor, the CNN function at each of a respective one of the plurality of core compute circuitry elements.

In one aspect, the method further comprises computing, during a runtime of the configurable processor, a layer of the CNN function at each of a respective one of the plurality of core compute circuitry elements.

In one aspect, the method further comprises computing, during a runtime of the configurable processor, an entire CNN at least one of the plurality of core compute circuitry elements.

In one aspect, the plurality of connections between the active memory buffer and the plurality of core compute circuitry elements are programmed during a compile time and fixed during a runtime of the configurable processor; and the plurality of connections between the plurality of core compute circuitry elements are programmed during the compile time and fixed during the runtime.

In one aspect, each of the plurality of core compute circuitry elements is configured to perform the CNN function for both inference and training.

In one aspect, each of the plurality of core compute circuitry elements comprises a memory configured to store a weight used to perform the CNN function.

In one aspect, the disclosure further provides a configurable processor dedicated to implementing convolution neural networks (CNNs), comprising: a plurality of means for performing a CNN function in accordance with a preselected dataflow graph; a means for storing data; a means for establishing connections between the means for storing data and the plurality of means for performing the CNN function, in accordance with the preselected dataflow graph; and a means for establishing connections between the plurality of means for performing the CNN function, in accordance with the preselected dataflow graph, wherein the means for storing data comprises a means for moving data between the plurality of means for performing the CNN function via the means for storing data in accordance with the preselected dataflow graph.

In one aspect, the disclosure further provides a configurable processor dedicated to implementing convolution neural networks (CNNs), comprising: a mobile industry processor interface (MIPI) input configured to be directly coupled to a MIPI source; a MIPI output configured to be directly coupled to an application processor; a MIPI bus coupled between the MIPI input and the MIPI output; and a configurable CNN sub-processor disposed serially along the MIPI bus such that all data on the MIPI bus passes through the configurable processor, the configurable CNN sub-processor configured to: receive image data from the MIPI source; generate processed data based on the image data; and provide the processed data to the application processor.

In one aspect, the configurable CNN sub-processor is further configured to generate the processed data based on the image data using a preselected CNN.

In one aspect, the configurable CNN sub-processor comprises a plurality of the configurable CNN sub-processors in a cascade configuration.

In one aspect, the configurable CNN sub-processor is configured to provide the processed data to the application processor via the MIPI bus.

In one aspect, the configurable CNN sub-processor further comprises: a plurality of core compute circuitry elements, each configured to perform a CNN function in accordance with a preselected dataflow graph; an active memory buffer; a plurality of connections between the active memory buffer and the plurality of core compute circuitry elements, each established in accordance with the preselected dataflow graph; and a plurality of connections between the plurality of core compute circuitry elements, each established in accordance with the preselected dataflow graph, wherein the active memory buffer is configured to move data between the plurality of core compute circuitry elements via the active memory buffer in accordance with the preselected dataflow graph.

In one aspect, the configurable CNN sub-processor further comprising: a non-MIPI output interface comprising at least one of a SPI, an I2C interface, or a UART interface; and wherein the configurable processor is configured to send information to the application processor using either the non-MIPI output interface or the MIPI bus.

DETAILED DESCRIPTION

Figure 1:
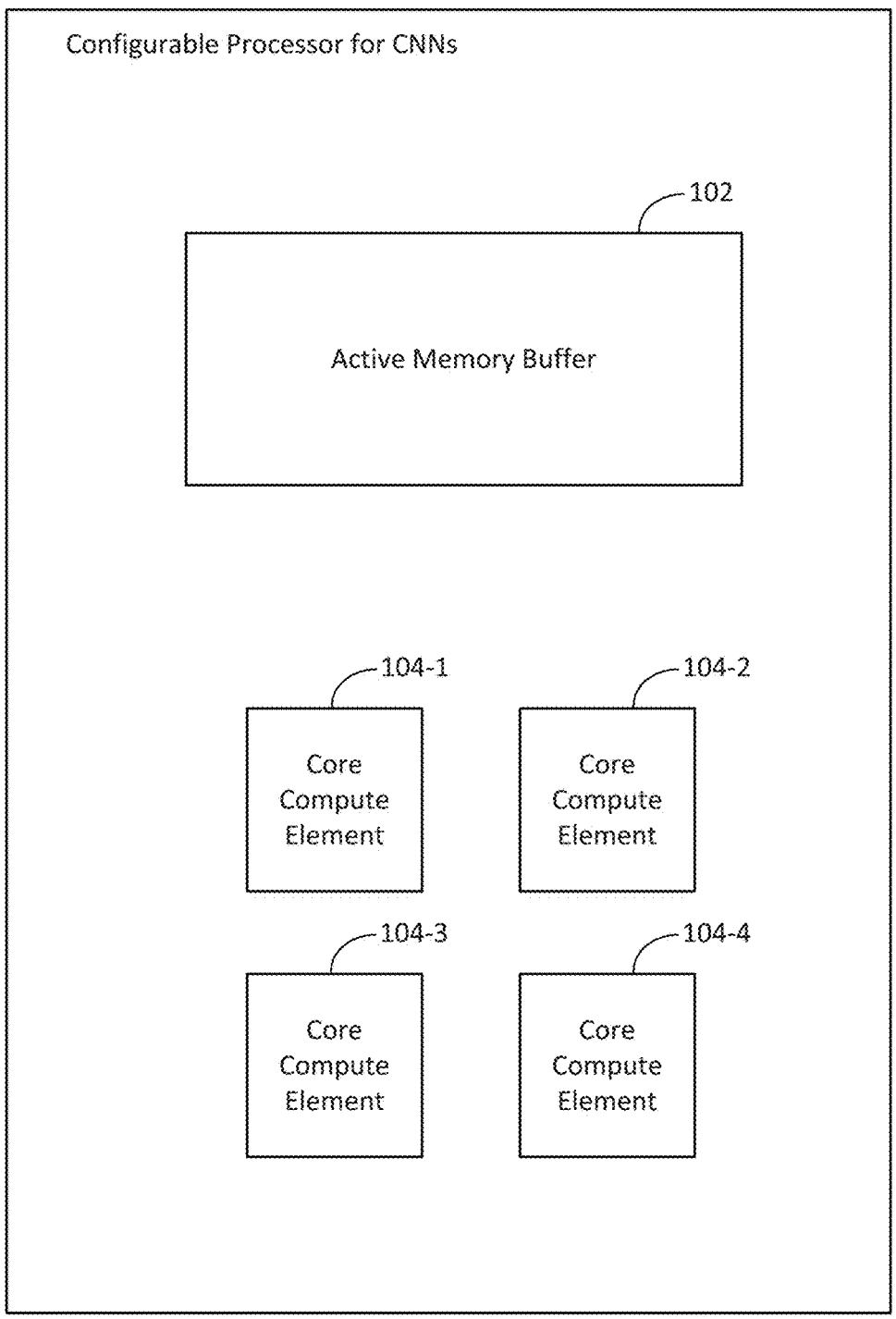
FIG. 1 is a block diagram illustrating an example configurable processor for implementing convolutional neural networks (CNNs), including an active memory buffer and multiple core compute elements, in accordance with some aspects of the disclosure.

Referring now to the drawings, embodiments of configurable processors for implementing convolutional neural networks (CNNs) are illustrated. These configurable processors can be dedicated to implementing the CNNs, and include a plurality of core compute circuitry elements, each configured to perform a CNN function in accordance with a preselected dataflow graph (e.g., corresponding to a preselected CNN), an active memory buffer, connections between the active memory buffer and the plurality of core compute circuitry elements, each established in accordance with the preselected dataflow graph, and connections between the plurality of core compute circuitry elements, each established in accordance with the preselected dataflow graph, where the active memory buffer is configured to move data between the plurality of core compute circuitry elements via the active memory buffer in accordance with the preselected dataflow graph. These configurable processors can thus include an architecture that allows for streamlined performance of CNN functions, while avoiding the pitfalls of traditional instruction set architecture (ISA or load/store architecture) type processors that are not specifically configured for implementing CNNs.

Overview

One drawback of the architectures described above for Groq and Gyrfalcon is that these architectures merely offer the traditional load/store architecture paradigm and thus are not geared specifically for CNN architectures. Traditional load/store architectures have a separate mechanism to pre-program the intended task while the data to be operated on is handled separately by a typical data-path architecture. In the configurable CNN processor architectures described herein we infuse a major part of the program control sequence into the data-flow itself, making it a highly efficient processor and at the same time highly specialized for processing CNNs.

One design goal involves developing a processor architecture intended for computing various CNN architectures. Ideally, the architecture needs to be low-cost, low-power and be able to process CNN architectures in real-time without accessing external memory. In one aspect, the configurable CNN processors described herein could be used as a co-processor to a system in order to compute CNN architectures. This enables use of architectural techniques that constrain the use of power by the processor. This disclosure presents one or more extremely low-power solutions by eliminating the need for a traditional controller for the data-flow control. In one aspect, this disclosure couples the control of data-flow across various modules of the processor with the data-in-flow to the architecture. Therefore, the data flowing in can be responsible for pushing the data through the system to the output. This kind of an architecture represents a data-flow architecture. In one aspect, the disclosure also involves use of hierarchically-distributed micro-programmed control-memory for a part of the control flow that cannot be coupled with the data-flow across the system.

A CNN architecture may require a large quantity of temporary memory to store output data at every layer of the CNN. This disclosure arranges data in such a way that the memory needs of different layers of the CNN may be aggregated and addressed using memory located in one physical space. This has significant benefits to power consumed and area efficiency. Simultaneously the disclosed architecture takes advantage of the fact that we may only need to store a certain number of input rows to successfully compute the convolution at each CNN layer, where storing the entire frame may be unnecessary for the convolutional stages of the CNN. Hence, the disclosed processor architecture, in some aspects, may store only the necessary line buffers at the input of each CNN. This has a combined effect, including reductions of net power consumed and chip area used for the overall architecture.

In one aspect, the configurable CNN processor includes an intelligent memory buffer (e.g., active memory buffer) that may have multiple input ports and multiple output ports. The intelligent memory buffer accepts input data from the multiple input data ports and stores them in a core memory array contained within the buffer. The intelligent memory buffer, using the multiple output ports, can distribute desired data to the correct core compute element (e.g., computational core module) while maintaining a standard protocol for delivering the data, in an order that is standardized throughout the system. This distribution of data can eliminate the need for using a program sequence to control the flow of data movement. Each of the core compute elements/modules can thus maintain a very simple profile of processing a repetitive task on the data with certain periodicity. The minimal programming information that may not be easily embedded in the data-flow control can be stored as a control sequence in the form of a hierarchically distributed micro-programmed control unit contained with each core compute element.

After processing data corresponding to a particular CNN layer, data can be written back to the intelligent memory buffer. Once data is available from the output of a CNN layer, the next layer can start to get processed, and so on. Therefore, the flow of data can be controlled by the rate at which data flows into the system. This eliminates the need for a load-store architecture to manage the flow of data across the system. Also, data is moved within the configurable CNN processor architecture in a very intelligent way that minimizes redundant data movement.

There are several modes of data transfer from the intelligent memory buffer to reduce redundant data transfer from memory to computational units. Data flow in-and-out of the intelligent buffer can be managed using an elastic FIFO thereby allowing flexible movement of data across the system, and making all internal data transfers less rigid. In one aspect, it may be expected that the intelligent memory buffer would endure heavy fan out driving numerous computational modules that operate in parallel. This typically might result in a relatively high-power penalty arising from use of multiple buffers to meet the timing requirements. In one aspect, this may further increase exponentially in chip layouts where transistors are made to be smaller and smaller. To decouple timing constraints from data flowing through and in-and-out of the core compute elements, all inputs and outputs of the computational module can be buffered using FIFOs. This allows different components in the system to operate asynchronous to each other. Further, this gives the ability to operate different core compute elements at different clock speeds to optimize power consumption.

The individual core compute elements can be highly flexible modules and can perform computations on small blocks of data. Each of the core compute elements, apart from communicating with the intelligent memory buffer, can communicate with nearby core compute elements. The core compute elements may be arranged in a hierarchical manner. A group of hierarchically arranged core compute elements may be grouped along with an intelligent memory buffer to make up a unit that is easily scalable. This makes the system highly modular and easy to scale. The modular system allows for multiple CNN architectures (e.g., multiple CNNs) to be executed in parallel, and also for multiple instances of such scalable modules to be cascaded together, and thereby implement very large CNN architectures.

In one aspect, at least some of the architectures presented herein can guarantee a low power profile by optimizing the total read and write operations from memory. The configurable CNN processor architecture can also provide a mechanism to move data across memory and computation blocks in a very efficient and optimal manner. In one aspect, it may reduce any redundant data movement across modules. In one aspect, the optimal power consumption can come from guaranteeing toggling of only the required bits and reducing redundancy and unnecessary toggling of bits across the system. The overall system architecture of embedding data-flow control in the data further can enhance optimal power consumption of the module. The design can also allow every core compute element and active memory buffer, or at least a subset of those components, to work on separate clock domains, thereby taking advantage of reducing clock distribution power of high frequency clocks.

In one aspect, the core compute elements could be dynamically set to use a higher frequency clock and the operating clock frequency of the intelligent memory buffer could be set to use a lower frequency clock for optimal power consumption. The core compute elements can operated under different modes of operation allowing each to be dynamically configured as any of the following operations: (1) a generic filter, (2) a separable filter, (3) a filter across multiple frames when time is another filter dimension (e.g., a 3D convolutional operation) or (4) long short term memory (LSTM) cells, where each of the core compute elements is dynamically configured into multiple parallel LSTM cells.

This disclosure further presents a routing algorithm that illustrates the mapping of a CNN algorithm onto a configurable CNN processor. This disclosure demonstrates that, at least in one aspect, the configurable CNN processor architecture is sufficiently generic such that it can map various kinds of CNN algorithms.

Example Configurable CNN Processors

FIG. 1 is a block diagram illustrating an example configurable processor 100 for implementing convolutional neural networks (CNNs), including an active memory buffer 102 and multiple core compute elements (104-1, 104-2, 104-3, 104-4, collectively referred to as 104), in accordance with some aspects of the disclosure. Each of the core compute elements (e.g., core compute circuitry elements) 104 can be configured to perform a CNN function in accordance with a preselected dataflow graph. The preselected dataflow graph can be derived from a preselected CNN to be implemented on the processor 100. The CNN functions can include one or more of a convolution function, a down-sampling (e.g., pooling) function, an up-sampling function, a native 1×1 convolution function, a native N×N convolution (e.g., 3×3 as will be described in greater detail herein) function, a configurable activation function through lookup table (LUT) value interpolation, an integration function, a local response normalization function, and a local batch normalization function. Each of the core compute elements can include an LSTM cell and/or inputs and outputs buffered by elastic shallow depth FIFOs. Additional details for the core compute elements 104 will be described below.

The active memory buffer 102 can be configured to move data between the core compute circuitry elements in accordance with the preselected dataflow graph. The active memory buffer 102 may include sufficient memory for these activities and to accommodate a large number of core compute elements.

A coupling fabric (not shown) exists between the core compute elements 104 and the active memory buffer 102 such that connections between the active memory buffer 102 and the core compute elements 104 can be established as needed. Similarly, the coupling fabric can enable connections between the core compute elements 104 as needed. The coupling fabric can be configured such that these connections are established in accordance with the preselected dataflow graph, corresponding the preselected CNN to be implemented.

In FIG. 1, the configurable CNN processor 100 includes four core compute elements 104. In one aspect, the configurable CNN processor 100 can include more than, or less than, four core compute elements 104.

In one aspect, each of the core compute circuitry elements 104 can be configured to perform the CNN function in accordance with the preselected dataflow graph and without using an instruction set. In one aspect, at least two of the core compute circuitry elements 104 are configured to operate asynchronously from one another. In one aspect, the active memory buffer 102 is configured to operate asynchronously from one or more of the core compute circuitry elements 104. In one aspect, each of the core compute circuitry elements 104 is dedicated to performing the CNN function. For example, in one aspect, each of the core compute circuitry elements 104 can be specifically configured to compute only the CNN functions, and not, for example, general processing tasks typically performed by general purpose processors.

In one aspect, each of the core compute circuitry elements 104 can be configured, prior to a runtime of the configurable processor 100, to perform the CNN function. In one aspect, each of the core compute circuitry elements 104 is configured to compute a layer (e.g., a stage) of the CNN function. In one aspect, each of the core compute circuitry elements 104 is configured to compute an entire CNN.

In one aspect, the connections between the active memory buffer 102 and the core compute circuitry elements 104 are established during a compile time and fixed during a runtime of the configurable processor 100. Similarly, in one aspect, the connections between the core compute circuitry elements 104 are established during the compile time and fixed during the runtime.

Further details regarding the active memory buffer 102 and the core compute circuitry elements 104 are provided below.

In one aspect, each of the core compute elements 104 can act as a means for performing a CNN function in accordance with a preselected dataflow graph, as well as core compute elements 304 and 1000 described below. In one aspect, the active memory buffer 102 can act as a means for storing data, and for moving data between the plurality of means for performing the CNN function (e.g., core compute elements) via the means for storing data in accordance with the preselected dataflow graph, as well as the active memory buffers 302 and 600 described below. In one aspect, the coupling fabric (not shown in FIG. 1 but see FIG. 3 and FIG. 15) can act as a means for establishing connections between the means for storing data (active memory buffer) and the plurality of means for performing the CNN function (core compute elements), in accordance with the preselected dataflow graph. This coupling fabric can also act as a means for establishing connections between the plurality of means for performing the CNN function (core compute elements), in accordance with the preselected dataflow graph.

Figure 2:
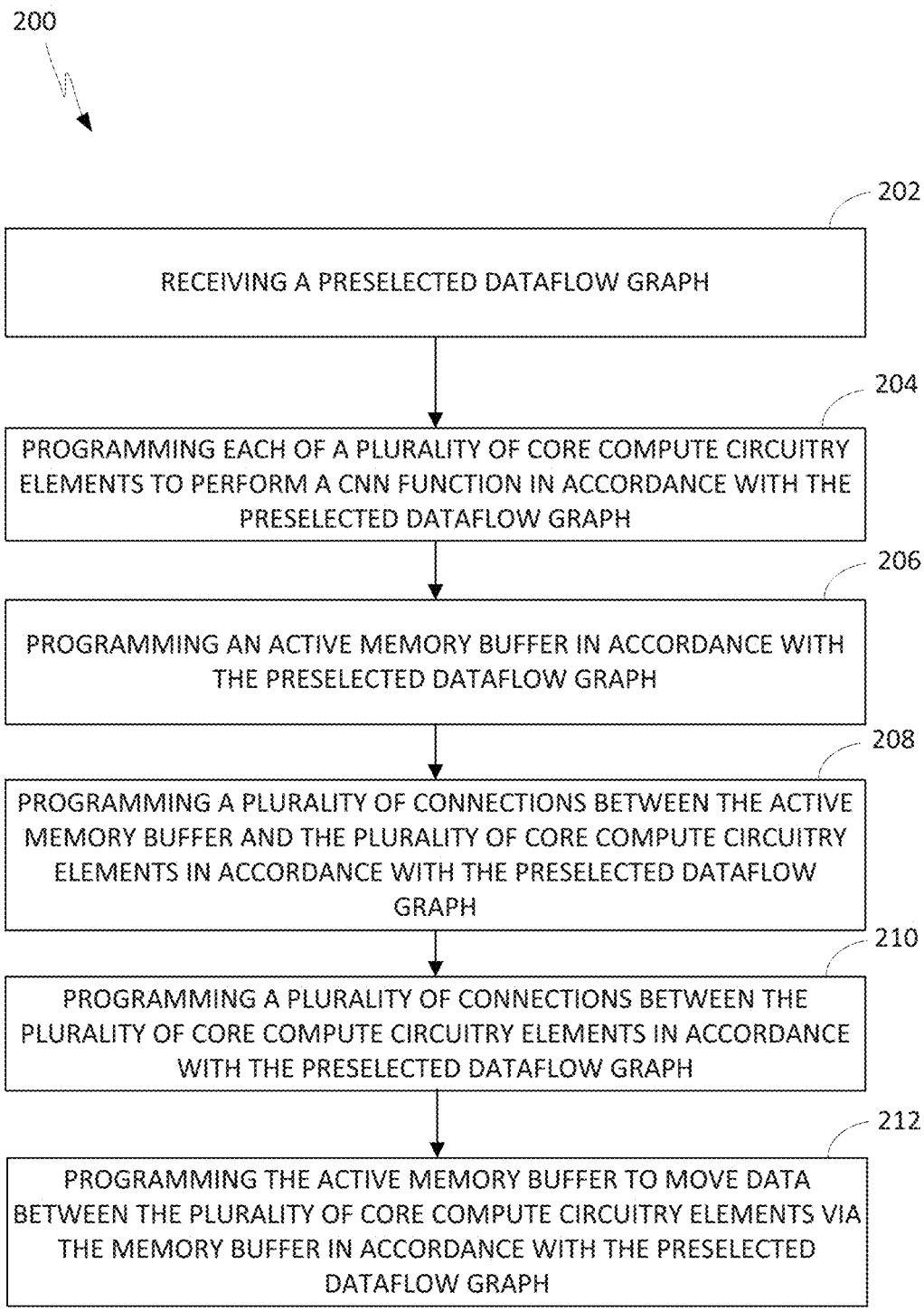
FIG. 2 is a flow chart illustrating a process for configuring a configurable processor for implementing CNNs in accordance with some aspects of the disclosure.

FIG. 2 is a flow chart illustrating a process 200 for configuring a configurable processor for implementing CNNs in accordance with some aspects of the disclosure. In one aspect, the process 200 can be performed by a computer coupled to the configurable CNN processor (e.g., configurable CNN processor 100 of FIG. 1). In block 202, the process receives a preselected dataflow graph. In one aspect, the preselected dataflow graph corresponds to, and was derived from, a preselected CNN to be implemented.

In block 204, the process programs each of a plurality of core compute circuitry elements to perform a CNN function in accordance with the preselected dataflow graph. The CNN functions can include one or more of a convolution function, a down-sampling (e.g., pooling) function, an up-sampling function, a native 1×1 convolution function, a native N×N convolution (e.g., 3×3 as will be described in greater detail herein) function, a configurable activation function through a lookup table (LUT) value interpolation, an integration function, a local response normalization function, and a local batch normalization function.

In block 206, the process programs an active memory buffer (e.g., such as active memory buffer 102 in FIG. 1) in accordance with the preselected dataflow graph.

In block 208, the process programs a plurality of connections between the active memory buffer (e.g., 102) and the plurality of core compute circuitry elements (e.g., 104) in accordance with the preselected dataflow graph.

In block 210, the process programs a plurality of connections between the plurality of core compute circuitry elements in accordance with the preselected dataflow graph. By the term "programs" as used in blocks 210 and 208, it is meant that the process establishes the various connections between components using the coupling fabric that exists within the CNN processor for coupling these components, prior to runtime.

In block 212, the process programs the active memory buffer (e.g., 102) to move data between the plurality of core compute circuitry elements (e.g., 104) via the memory buffer in accordance with the preselected dataflow graph.

In one aspect, each of the programming activities (e.g., as described in blocks 204-212) is performed prior to a runtime of the configurable processor.

In one aspect, the process further includes operating the plurality of core compute circuitry elements to perform the CNN function without using an instruction set, and/or operating the active memory buffer without using an instruction set.

Figure 3:
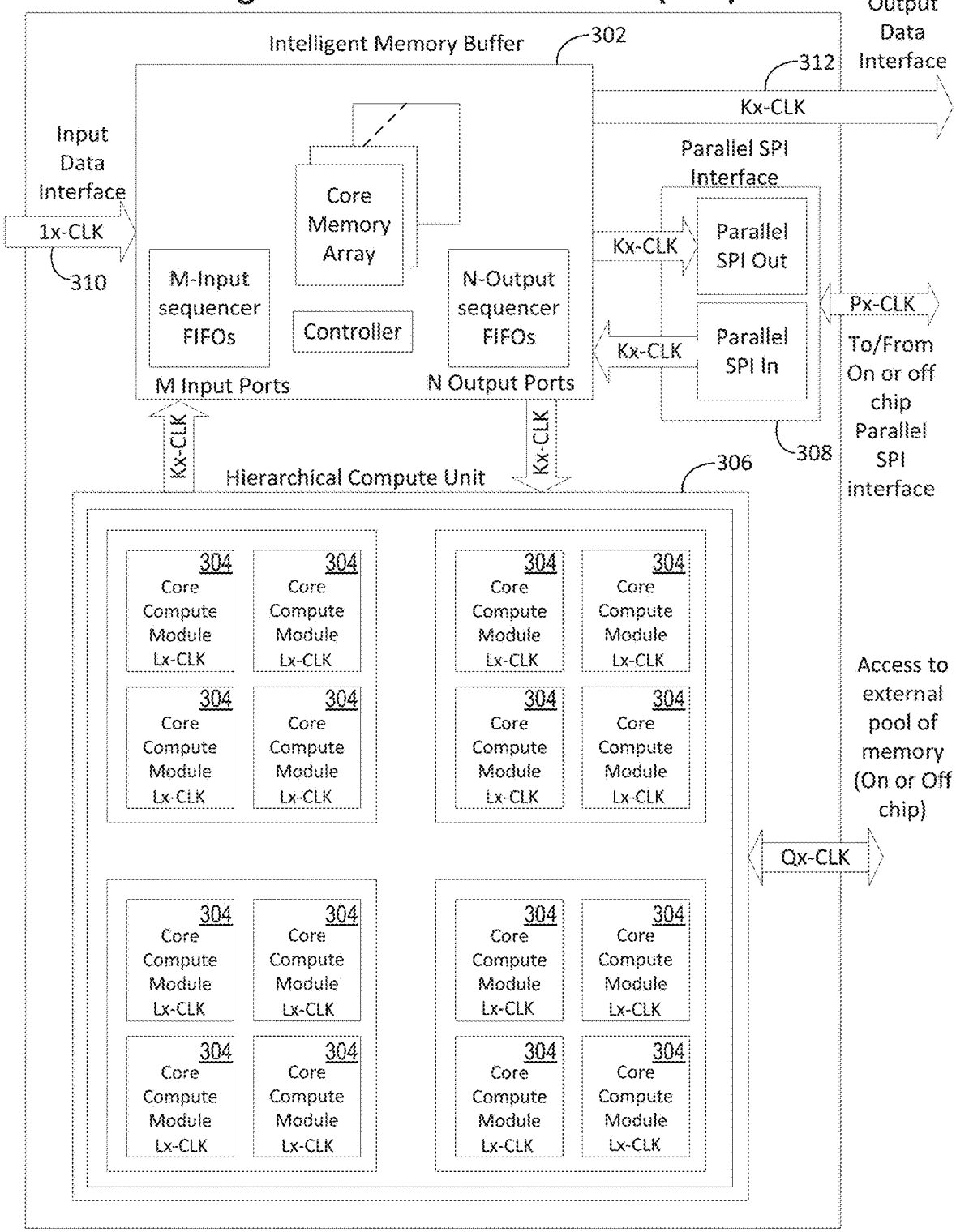
FIG. 3 is a block diagram illustrating an example configurable processor for implementing CNNs embodied as a programmable functional unit (PFU) in accordance with some aspects of the disclosure.

FIG. 3 is a block diagram illustrating an example configurable processor 300 for implementing CNNs embodied as a programmable functional unit (PFU) in accordance with some aspects of the disclosure. The PFU 300 includes an intelligent memory buffer (e.g., active memory buffer) 302, sixteen core compute elements 304 within a hierarchical compute unit 306, and a parallel SPI interface 308. In one aspect, the active memory buffer 302 and core compute elements (e.g., core compute circuitry elements) 304 can operate as described above for FIGS. 1 and 2.

FIG. 3 can be viewed as a hierarchical representation of multiple core-compute elements/modules 304 with a single intelligent memory buffer 302, which collectively can be referred to as the PFU. Each of the core compute elements 304 can be accessible through a few read and write ports of the intelligent memory buffer 302. The PFU 300 further includes an input data interface 310 and an output data interface 312. Input data received via the input data interface 310 and output data sent via the output data interface 312 can directly interface with a read and write port, respectively, within the intelligent memory buffer 302. This can allow other PFU units to communicate with each other on a point to point basis via the read and write ports based on a transmitter and receiver configuration.

A read port (e.g., any one of the M input ports) and a write port (e.g., any one of the N output ports) can also be used to serialize and de-serialize data to be communicated over the serial to parallel interface 308, such as an SPI, with the other PFUs on a different chip. The SPI 308 can provide a relatively low power implementation of a communication channel between two PFUs across the chip boundary. In one aspect, PFU 300 is implemented using a single chip. Data sent via the parallel interface 308 within the PFU chip can be serialized and transmitted over a printed circuit board (PCB) and then parallelized once received at the destination chip (e.g., a second PFU). The serial link can be any kind of a serial link, from a simple SPI to a more complicated clock embedded link.

The PFU 300 may also include an interface with an external memory outside the PFU for the core compute elements to access a larger pool of memory. In a typical CNN, only a few layers need to access a large number of weights, specifically the fully connected layers. With only a few CNN layers needing to access a large number of weights, each PFU can be configured with only enough weight memory to store an average number of weights that are used in a convolution layer. As used herein, "weight memory" means memory of a core compute element used to store weights for processing/computing a CNN layer. Whenever a core compute element needs to access a larger amount of weight memory, it can fetch from the external larger pool of memory. However, the memory bandwidth for the external memory may be sufficient to support two core compute elements without any backpressure. Any larger number of core compute element accessing the larger pool of weight memory may result in reduced throughput.

When a particular convolution operation does not fit in a single core compute element due to a weight memory constraint, a convolution transformation (as shown, for example, in Case-2 of FIG. 15) can also be utilized to split the convolution across multiple core compute elements. This mechanism allows regular PFUs to be restricted to a relatively low amount of weight memory, and yet have the capability to access a larger number of weights either by accessing the external large pool of memory or by spreading the convolution across multiple core compute elements using convolution transformations.

Additional Configurations for Configurable CNN Processors

Figure 4:
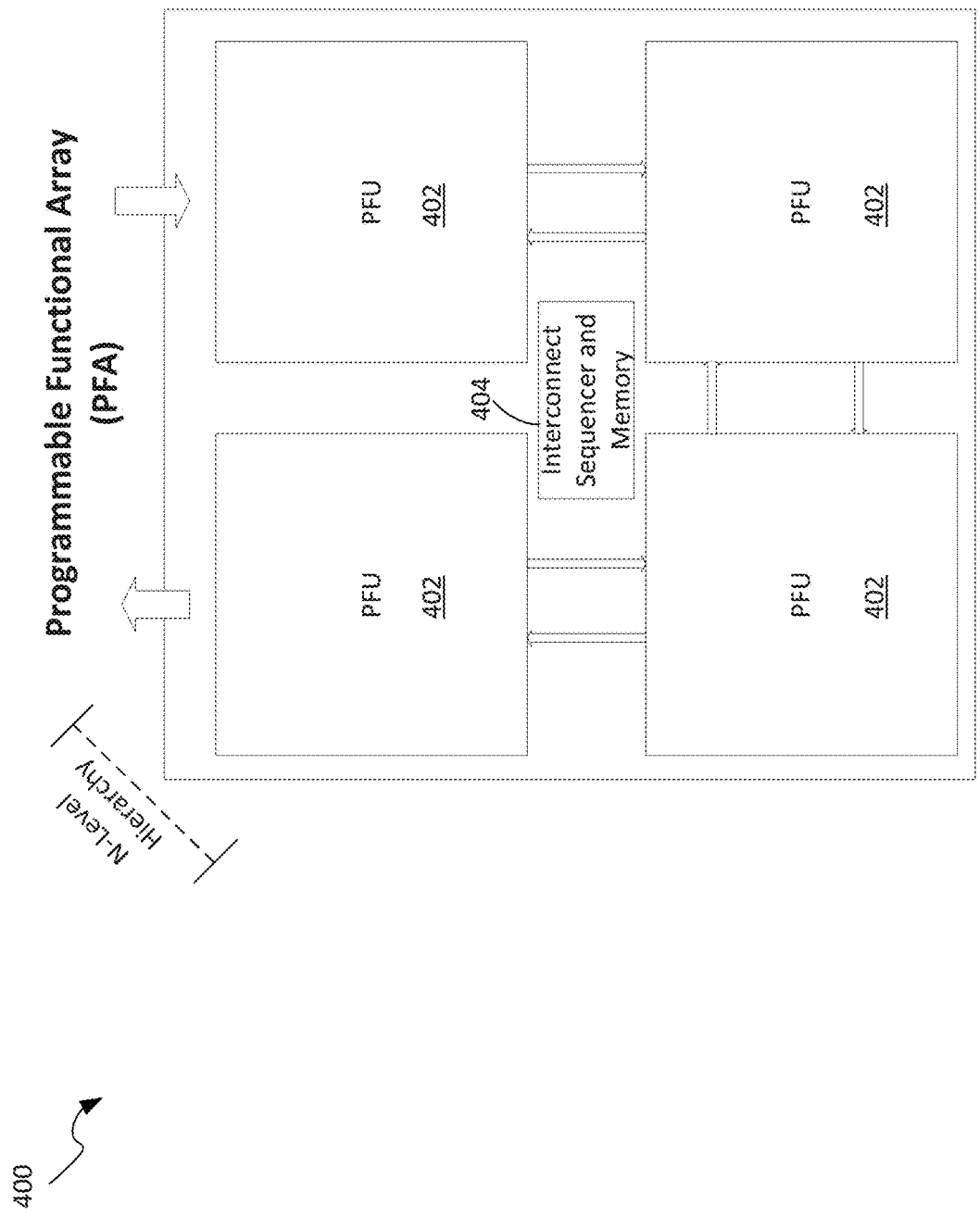
FIG. 4 is a block diagram illustrating a configurable CNN processor embodied as a programmable function array (PFA) that includes multiple PFUs in accordance with some aspects of the disclosure.

FIG. 4 is a block diagram illustrating a configurable CNN processor 400 embodied as a programmable function array (PFA) that includes four PFUs 402 in accordance with some aspects of the disclosure. This configurable CNN processor 400 embodied as the PFA can be viewed as a hierarchical aggregation of the PFUs discussed earlier. Similarly, multiple PFA's could be staged in parallel to form the overall configurable CNN processor or the PFA processor. Interconnectivity between the PFU's can be controlled by the interconnect module 404, which may be programmed at compile time as described by the CNN data flow graph.

What this disclosure presents as a configurable CNN processor departs from the traditional approach of processor design where instructions are compiled from a programing language, stored in the processors, and at execution time the instructions are executed and the data flow across the processor is controlled at runtime. The traditional instruction set architecture also allows the programmer to interface with external inputs/outputs (IOs) to communicate with the rest of the world to fetch data and transfer processed output data. The instruction set architecture allows for the abstraction of the hardware and allows for complicated software development including high-level language programming and compilation. This is easily possible in a general-purpose processor where the instruction set architecture provides a great deal of flexibility.

On the other hand, a lot of power can be optimized if it is assumed that the processor is dedicated to a specific set of tasks and that the requirement for a runtime control flow mechanism that allows flexibility and instruction set abstraction can be restricted. Such restriction in the architecture may be possible if the application is well-bounded. In this case, the application of the configurable CNN processor can be restricted to CNN centric operations. Based on this assumption, the disclosure can assume that data flow control can be statically allocated at compile time and that the configuration of the memory and core compute elements based on the dataflow graph of the CNN is sufficient to control data flow. Thus, at run time, the only activity that may need action is computation on the data based on input specifications for a preselected computation rate and/or data rate.

In one aspect, for the configurable CNN processor, which can be a dedicated CNN processor and also called the PFA processor, this disclosure can assume the purpose of the processor is to process dataflow graphs similar to that represented by CNNs or a variant based on convolution transformations. This disclosure, including for example, compiler software dedicated for the configurable CNN processor, analyzes the dataflow graph of a preselected CNN, optimizes it, and then maps the functionality of the graph representing the CNN on to the configurable CNN processor. The mapping of the CNN graph can be done by programming the interconnectivity of the core compute elements and the intelligent buffers and their hierarchy, such as in the process 200 of FIG. 2. The programming of the configurable CNN processor can include:

(1) programming of the core compute elements, their operating modes, and all configuration that is statically defined at compile time;

(2) programming of the intelligent memory buffer, which can include programming of all the write and read ports configurations including assigning which core compute element is to be attached/coupled to which read and/or write port;

(3) dataflow and connectivity can be programmed at each PFU level, and possibly at the PFA level and across other parallel PFA units. In one aspect, all interconnect configuration is determined at compile time and is static at runtime (e.g., does not change with time during computation). A CNN data flow graph can also be mapped across multiple PFA units or multiple chips (e.g., PFUs or PFAs) communicating over the parallel-to-serial and serial-to-parallel interfaces. In such case, each chip can be programmed independently. The inter-chip communication latency can be pre-determined at compile-time based on the maximum latency posed by the parallel-to-serial-to-parallel interface. In one aspect, PFA 400 is implemented using a single chip.

Figure 5:
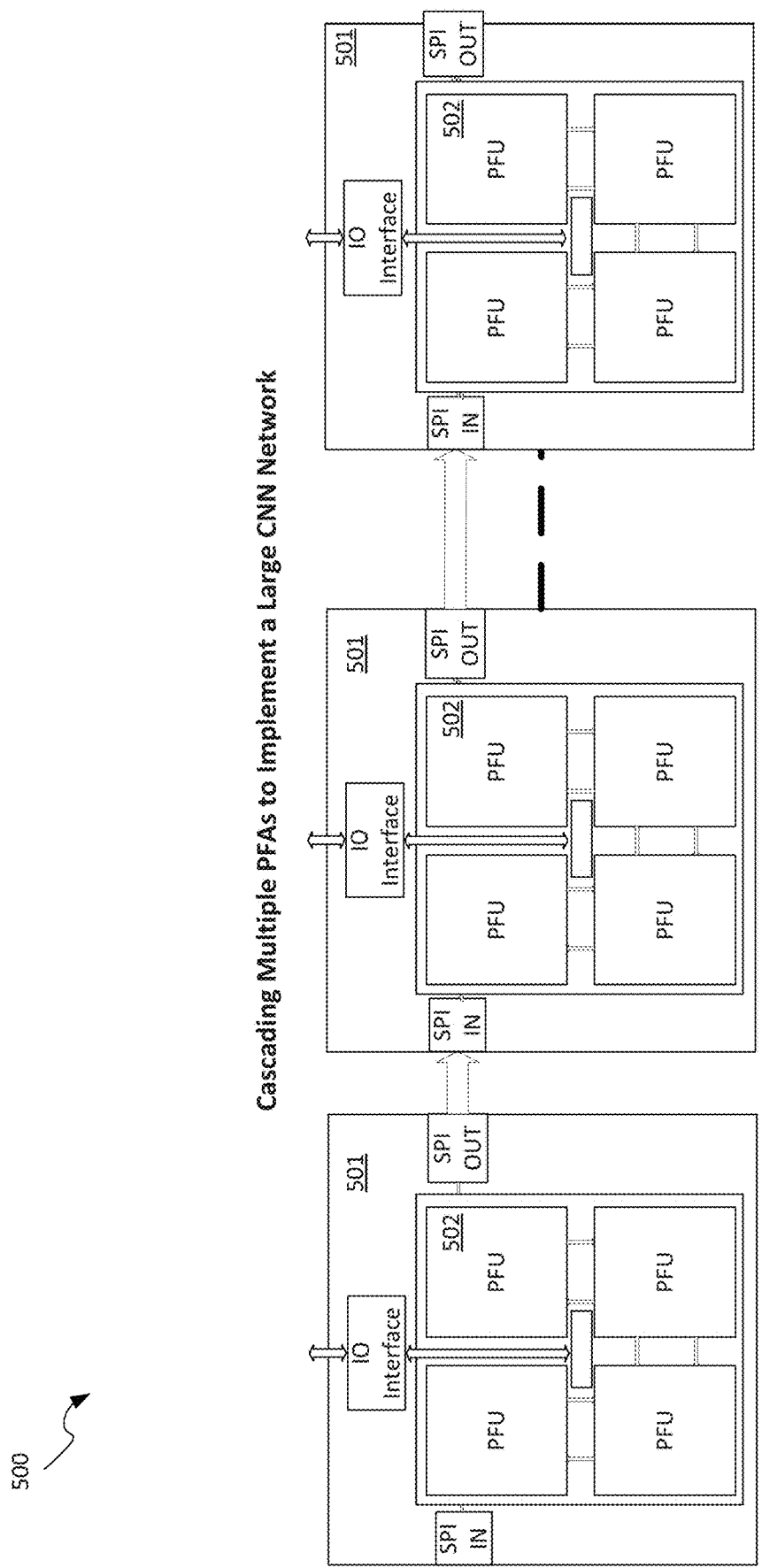
FIG. 5 is a block diagram illustrating a configurable CNN processor embodied as a system including multiple PFAs in a cascade configuration in accordance with some aspects of the disclosure.

FIG. 5 is a block diagram illustrating a configurable CNN processor embodied as a system 500 including multiple PFAs 501 in a cascade configuration in accordance with some aspects of the disclosure. FIG. 5 shows how multiple PFAs 501 may be connected in series. In this example, each of the PFAs 501 implements four PFUs 502. Also, a single SPI in and SPI out are included on each PFA 501 in this example. In one aspect, multiple SPI in and SPI out ports could be used. The ability to cascade multiple PFAs enables the user to implement either a deep CNN, which otherwise may have been impossible using a single chip, or to implement multiple CNNs in parallel which also may have been impossible to implement using a single chip.

Configurable CNN Processor Components

Figure 6:
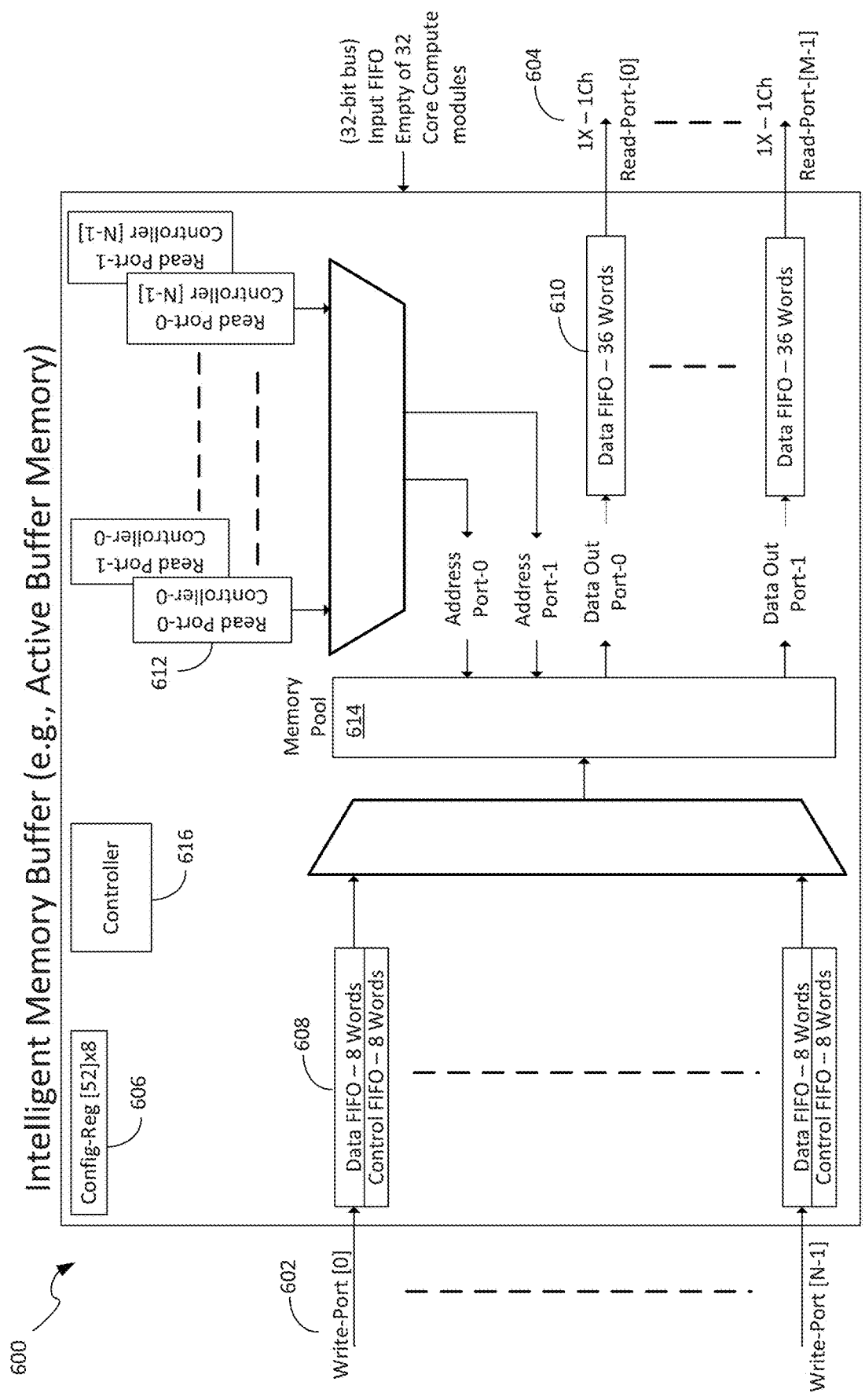
FIG. 6 is a block diagram illustrating an example active memory buffer for use within a configurable CNN processor in accordance with some aspects of the disclosure.

FIG. 6 is a block diagram illustrating an example active memory buffer 600 for use within a configurable CNN processor in accordance with some aspects of the disclosure. The main IOs are the write ports 602 and read ports 604. The other IO interface is a register-module interface 606 responsible for configuring the intelligent memory buffer 600. Each read/write port (604, 602) is supported by a small first in first out data buffer (FIFO) (608, 610), effectively making the memory operations elastic. Similarly, each core compute element can include FIFOs at the inputs and outputs, thereby making the entire data flow across the memory and different core compute elements very elastic.

The read ports 604 are controlled by numerous parallel read port controllers 612. Each read port controller 612 can be programmed separately indicating which output the read port is to be controlling. Each read port controller 612 is responsible for driving data from the memory 614 to a particular core compute element (not shown) through a chosen read port 604. Each of these controllers 612 can be serviced in a round-robin fashion for each of the read ports 604. This allows the compiler to overload a read port 604 to drive multiple core compute elements or to select a single read port 604 to drive a single core compute element based on the requirements of the preselected CNN to be implemented. This gives flexibility in how the intelligent memory buffer and the core compute elements are configured and/or connected, optimized based on data rate requirements.

Each of the input write ports 602 is coupled to, and provided with, a FIFO 608. The input FIFOs 608 can be addressed in a round-robin fashion. Having FIFOs (608, 610) at both the write ports 602 and read ports 604 of the active memory buffer 600 and having FIFOs at the input and output of the core compute elements enables use of a truly asynchronous bus architecture. This can be helpful, especially at the top level of the chip where connecting multiple PFUs together to form a single PFA (e.g., one chip) becomes a challenge, particularly from a timing closure point of view. In one aspect, multiple PFU modules can be aggregated together to form a PFA (e.g., chip) which can be an embodiment of a configurable CNN processor. A PFA or PFA module represents the top view of the chip. The relaxation in the timing requirements at the chip top-level is particularly helpful, as it may save power, especially of the clock tree in an attempt to deliver edge-aligned clocks to every leaf node.

The clock distribution within the chip can be very challenging, especially at the top level of the chip where clock tree branches have to make sure all leaf nodes maintain clock-edge synchronicity across the chip. The ability to run different module asynchronous to each other, for example, the intelligent memory buffer 600 and the core compute elements running at the same clock frequency but with asynchronous clock domains, relaxes constraints on the clock tree. As a result, many clock buffers that are usually added in synchronous circuits become redundant. Clock trees in consumer electronics can consume an average of 60% of the device power. The ability to reduce this power is significant. The fact that multiple blocks can operate asynchronous to each other on the same clock frequency relaxes the numerous clock tree buffers that would have otherwise been used to edge align the clocks in the entire clock tree. An implementation can exist where the different blocks are all on a synchronous clock domain.

The FIFO requirements (e.g., size) at both the read and write ports may be shallow and are a function of the expected or defined data rate of each of the write and read ports.

The contiguous memory 614 can be a single or dual-port memory or even multiple ports. The choice of the number of native ports in the contiguous memory 614 is dependent on the maximum data rate to be processed under full capacity. Realistically, with the increase in several native ports, the power consumption may increase exponentially, and thus keeping a lower number of ports may be ideal from a power standpoint. However, the maximum data rate design goal might drive a selection of a dual-port memory, preferably not to exceed more than two native ports, at least in one aspect. The memory 614 could be physically organized in a manner that best suits layout. The physical boundary of a memory could be either address space or data width of the memory as appropriated by the physical memory design compiler.

The intelligent memory buffer 600 is not restricted to implementing a single CNN. In one aspect, it can implement multiple CNNs simultaneously as long as the multiple CNNs have a common data flow graph. For example, if there are two CNNs to be implemented simultaneously, one CNN graph can be a subset of the other CNN.

Lastly, the controller 616 can be responsible for synchronizing all the control signals for appropriate data flow as selected by the configuration registers 606.

Above it was noted that the data flow can be made elastic by the use of the FIFOs (608,610). More specifically, the FIFOs used can be asynchronous FIFOs. As a result, the core compute elements and the intelligent memory buffer 600 can effectively run on different clock domains. Data flow in the configurable CNN processor can be controlled by the intelligent memory buffer 600. The intelligent memory buffer 600 supports various read and write ports that operate simultaneously at various data rates and have bursts of traffic that are completely asynchronous to each other. If this were to be controlled by an instruction set architecture, synchronization between various ports and transferring data across various write and read ports would require a lot more logic and hence would consume more power. In the design presented herein (e.g., in FIG. 6), each of the FIFOs in the write and read ports are designed to be of shallow depth. This FIFO structure allows for back pressure to the source of the data generator. Thereby, the intelligent memory buffer/design can handle burst data flow and put backpressure on the data generation source resulting in an architecture where the exact flow of data is not predetermined and elasticity is provided in the data flow link. Also, it is not a requirement for the intelligent memory buffer and the core compute elements to be operating at the same frequency clock but asynchronous to each other. In fact, depending on the implementation, the operating frequency of different modules could be adjusted to lower the overall power consumption.

In one aspect, the intelligent memory buffer can be configured to support data having different/multiple data widths (e.g., widths of different size) that can be chosen at compile time, such as 2, 4, 8 or 16 bit operations. This enables for power saving due to reduced data width handling where full width data processing may be unnecessary. As a result, reading and writing can be performed using only the bit width that is chosen at compile time. Power savings from these memory operations can be substantial.

Figure 7:
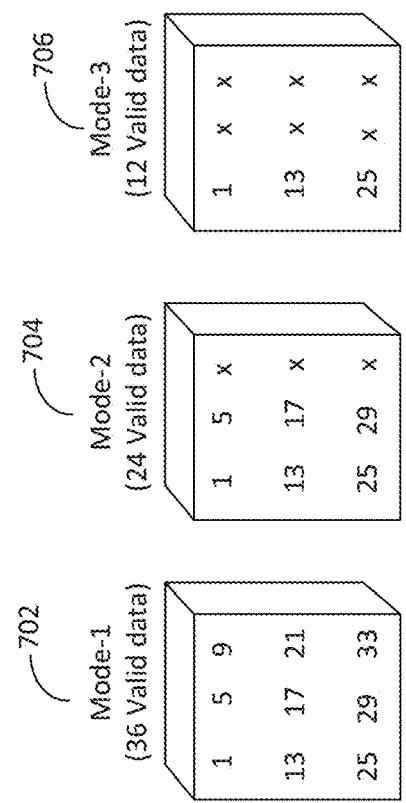
FIG. 7 is a perspective view illustrating an example memory organization for an active memory buffer in accordance with some aspects of the disclosure.
Figure 7:
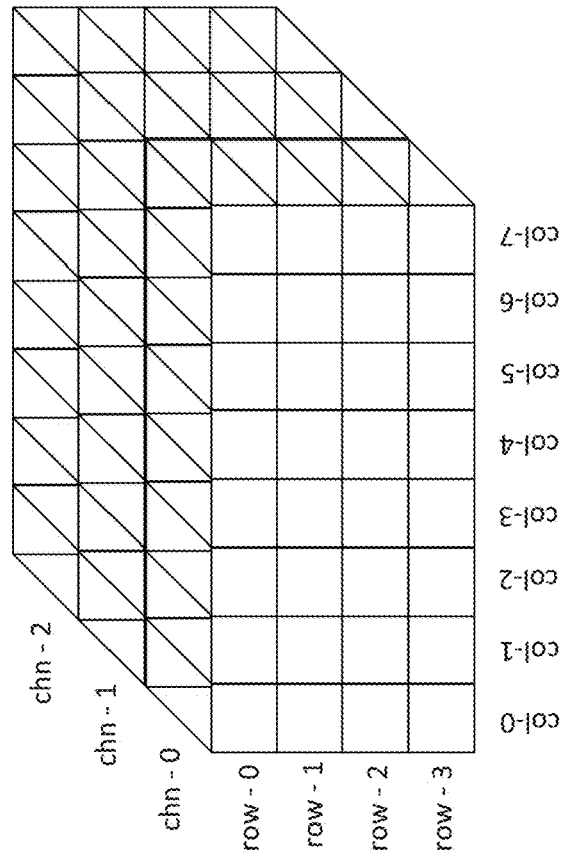
Figure 7:
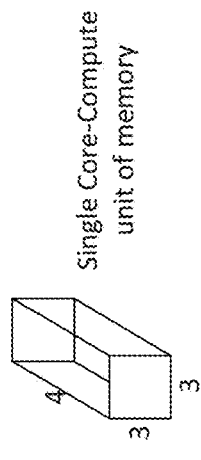

FIG. 7 is a perspective view illustrating an example memory organization 700 for an active memory buffer in accordance with some aspects of the disclosure. FIG. 7 indicates various modes of transmitting data from an active memory buffer to a core compute element. The core compute elements operate on chunks of data blocks provided by the intelligent memory buffer. Depending on the convolution type, the intelligent memory buffer can provide data to the core compute element in three different modes (702, 704, 706). The mode values themselves can be embedded in the transmission protocol. While computing convolution there may be an overlapping data requirement by the core compute module. For example, in one aspect, while computing a 3×3×N convolution, the new data block may only be of dimension 1×3×N while the rest is reused from the previous convolution. In one aspect, computing a 1×1 convolution may require the Mode-1 block to be transmitted every time as there are no overlapping data points. In one aspect, the Mode-3 block can also be used when computing the convolution as the edges of the input dimension. The Mode-2 block can be used when a 3×3 convolution with stride-2 is being computed. Use of these different modes can prevent duplicate memory read operations, which may save power.

Figure 8:
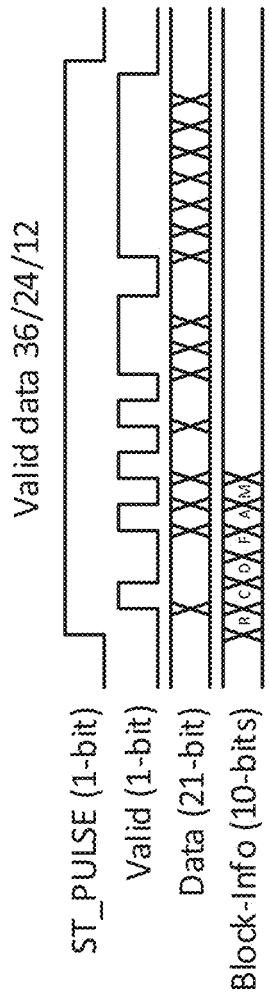
FIG. 8 is a timing diagram illustrating an example protocol for sending data from an active memory buffer to a core compute element in accordance with some aspects of the disclosure.

FIG. 8 is a timing diagram illustrating an example protocol 800 for sending data from an active memory buffer to a core compute element in accordance with some aspects of the disclosure. The block information (e.g., Block-Info) can make each of the transmission packets self-contained. The block information also labels the destination core compute element of the data packet. The address of the core compute element (e.g., "address of 36-M", where "36-M" can refer to a core compute element) is part of the block information. This protocol also allows for transmission of data from one read port of the active memory buffer to one or more, even all, of the core compute elements. The block information also contains information about the row, column, and depth dimensions of the input data volume. This gives the intelligent memory buffer the ability to transmit only the region that is of interest for processing.

Figure 9:
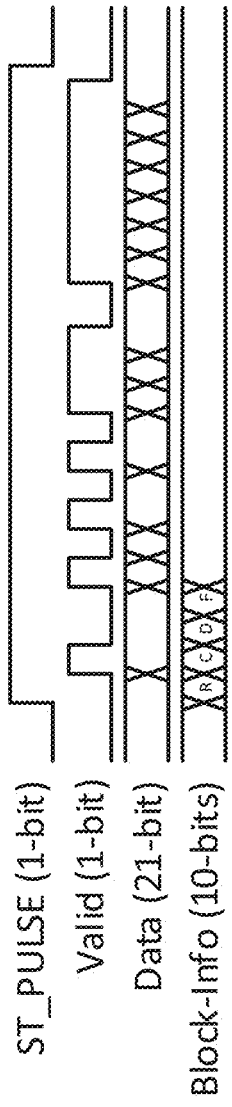
FIG. 9 is a timing diagram illustrating an example protocol for receiving data at an active memory buffer from a core compute element in accordance with some aspects of the disclosure.

FIG. 9 is a timing diagram illustrating an example protocol 900 for receiving data at an active memory buffer from a core compute element in accordance with some aspects of the disclosure. The example protocol 900 is similar to the example protocol 800 of FIG. 8. In one aspect, it can be assumed that the data being written into the intelligent memory buffer will be written in a raster scan fashion with depth being the first dimension being written into followed by column and then row.

Figure 10:
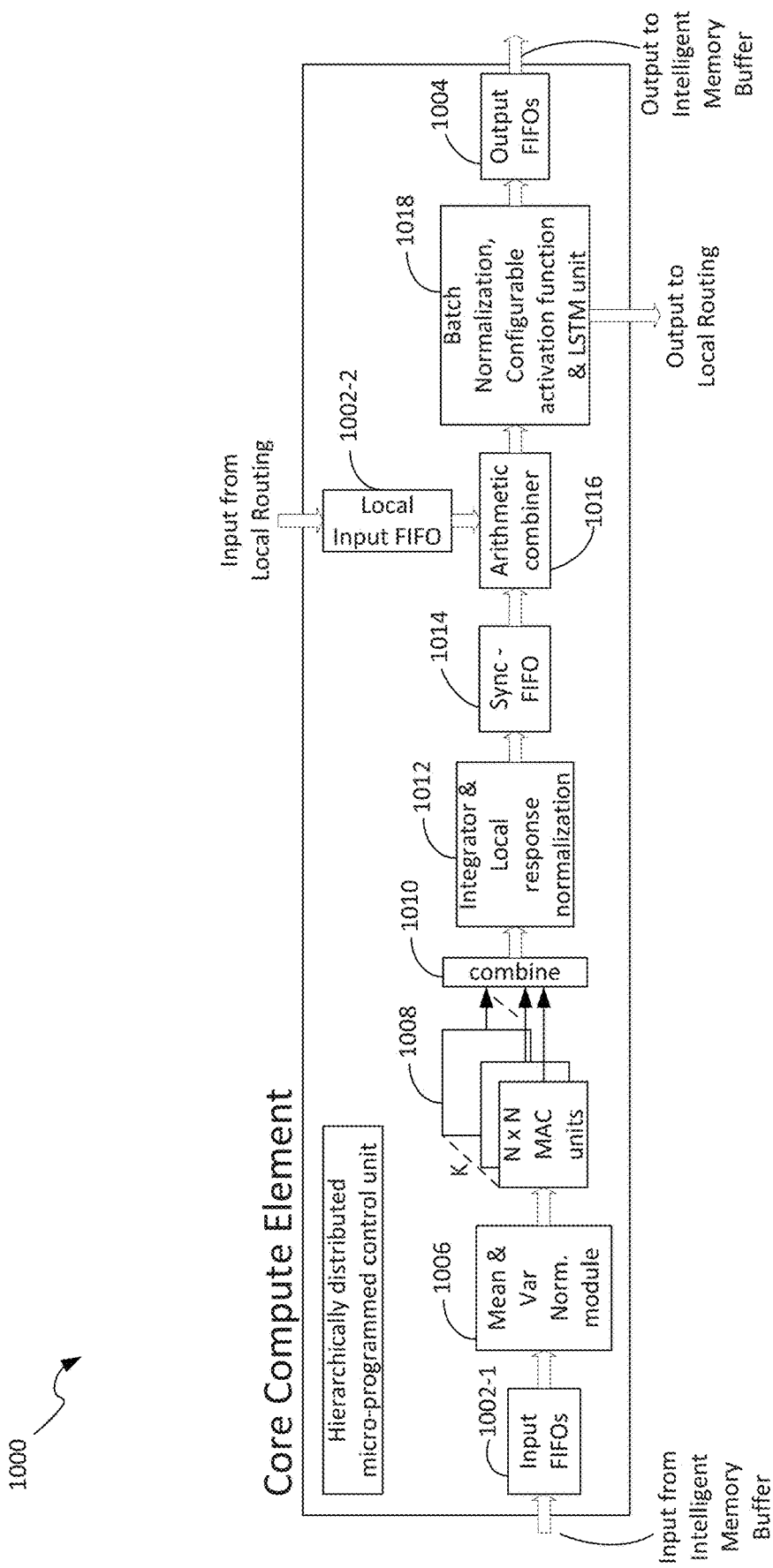
FIG. 10 is a block diagram illustrating an example core compute element for use within a configurable CNN processor in accordance with some aspects of the disclosure.

FIG. 10 is a block diagram illustrating an example core compute element 1000 for use within a configurable CNN processor in accordance with some aspects of the disclosure. The core compute element 1000 has elastic FIFO buffers both at the inputs (1002-1, 1002-2, collectively referred to as 1002) and the output (1004). These FIFOs (1002, 1004) can enable asynchronous data transfer between the active memory buffers and the core compute elements. As such, one could implement the active memory buffer running at a different clock speed as compared to the clock speed of the core compute element. This is realistic since the core compute element 1000 will be able to operate at a much higher clock speed compared to the intelligent memory buffer which may be restricted by the speed of the internal memory. The asynchronous connectivity is also especially attractive at the top level where meeting timing becomes challenging, for example, by trying to edge align all the clock leaf nodes. With a relaxed timing requirement, layout at the chip top level becomes easy and reduces power by eliminating the need for excessive buffers to match clock edges at every leaf node.

In one aspect, the core compute element can be configured to support computational data widths of multiple sizes. In such case, the data width can be chosen at compile time, including data widths, for example, corresponding to 2, 4, 8 or 16 bit operations. This feature may provide power savings by using reduced width computation where full width computation is unnecessary.

The input FIFOs 1002 may act as a ping-pong buffer, where one buffer (1002-1) could be written to by the active memory buffer while the core compute element could do work using the other buffer (1002-2), thereby enabling pipeline operation and eliminating wait time. The input buffer 1002-1 from the intelligent memory buffer feeds the input data to a normalization module 1006 based on fixed mean and variance. In one aspect, the module 1006 can operate on the data by subtracting every data point by the mean and multiplying by the inverse of the variance. The value of mean and variance are programmable at compile time.

The output of the normalization module 1006 feeds into an array of parallel multiply and add units 1008 that implement the convolution, followed by a combiner 1010 of the results 1010 and an integrator and local response normalization module 1012. Each of these modules is configurable at compile time. The output is then synchronized with a FIFO 1014 with the input data from a nearby core-compute module which is also synchronized by a local input FIFO 1002-2. The output of these two FIFOs (1002-2, 1014) are arithmetically combined 1016 and the following module 1018 computes batch normalization and an activation function. An activation function can be computed using a look up table (LUT) which gives the flexibility to implement any activation function possible. This module 1018 can also output the computed data to a nearby core compute element using local routing. This output data is buffered by the output FIFO 1004 before transmitting it to the intelligent memory buffer. In one aspect, each core compute element can be configured to perform a preselected CNN function for both inference and training.

Figure 11:
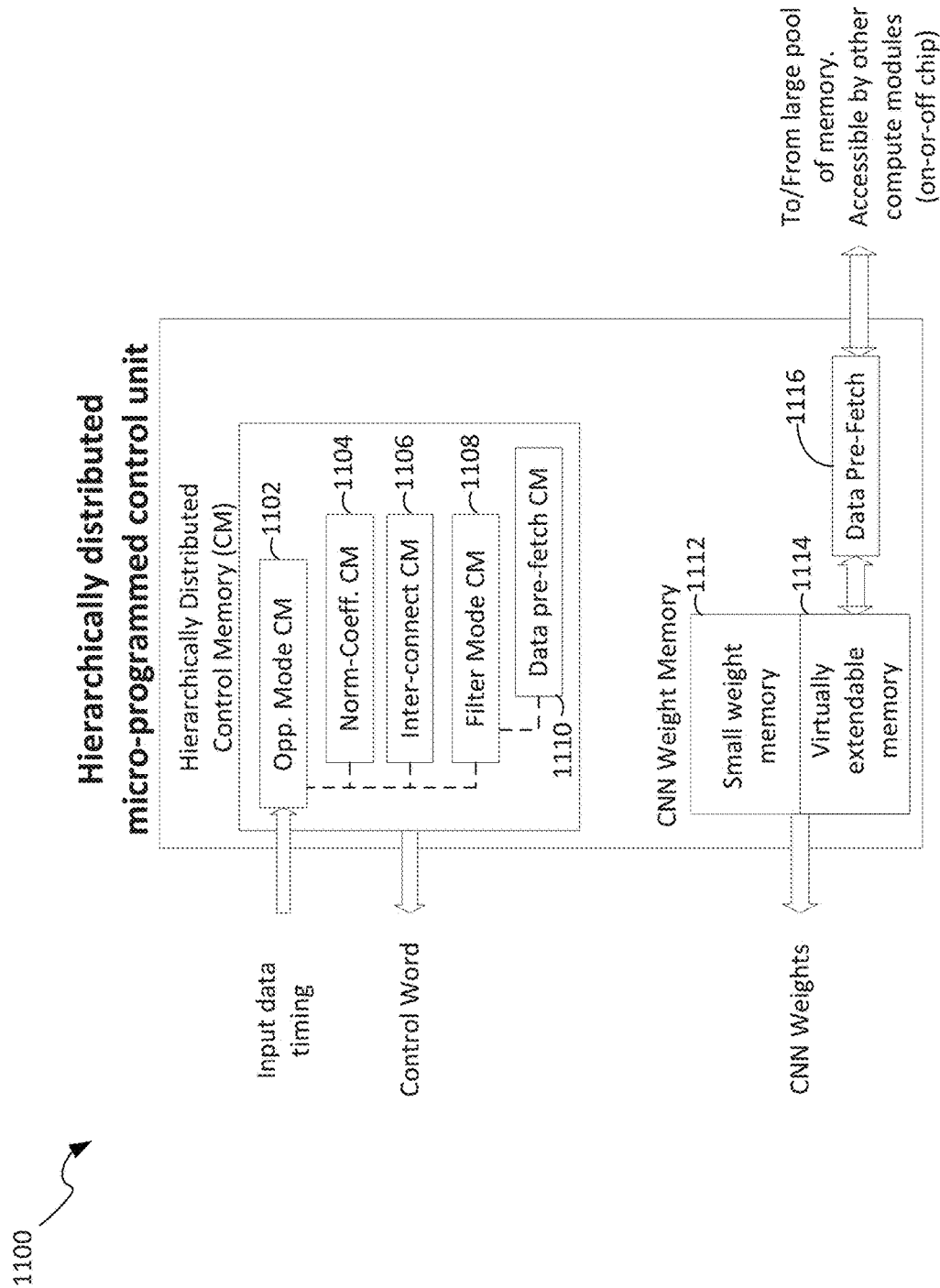
FIG. 11 is a block diagram illustrating an example control unit for use within a core compute element in accordance with some aspects of the disclosure.

FIG. 11 is a block diagram illustrating an example control unit 1100 for use within a core compute element in accordance with some aspects of the disclosure. The control unit 1100 of the core compute element can be implemented as a hierarchically distributed micro-programmed control unit or can also be implemented as a hard-wired control unit. FIG. 11 shows the control unit implemented as a hierarchically distributed micro-programmed control unit. Input timing data controls the addressing of different memories containing the control word. These control words are responsible for controlling the signals responsible for dataflow across the core compute element. In one aspect, the hardwired implementation of the control unit may be most optimal with respect to power consumption. At the same time, it may be very challenging to implement.

The control unit 1100 can be responsible for controlling data flow within a core compute element, and for ensuring correct operations of the core compute element/module. In control unit 1100, the control words can be divided into categories based on the mode of operation. Based on the mode of operation, the appropriate control work is selected. The control word memories, which include 1102, 1104, 1106, 1108, and 1110, can be of shallow depth. The operations-Coeff control memory (CM) 1104 can store the distinct control words that control the general operations of the core compute element. The inter-connect CM 1106 can be responsible for storing the unique control words that determine the interconnects within the core compute element. The data pre-fetch control memory 1110 can store the control bits for fetching weights external to the core compute element. The filter mode CM 1108 can be responsible for storing unique control bits that control the flow of filter coefficients from the coefficient memory to the actual place of the computation. The operations in the core compute element can be periodic in nature. As a result, the total number of unique control words needed may be few in nature and hence the shallow depth. An implementation of the core compute element is possible where the micro-programmed control unit 1100 is replaced by a hardwired control unit and would not change the operations of the overall processor.

The control unit 1100 is also responsible for fetching weights from weight memory. The control unit 1100 can address weights requested from beyond the physical limits of the local weight memory 1112 (e.g., about 6 to 8 megabits) by fetching those weights from an external pool of memory. This is referred to as the virtual extendable memory 1114. A data-prefetch unit 1116 can read data from the external pool of memory under the assumption that only one or two core compute elements might require access to the external pool of memory. Too many requests for memory access from numerous core compute elements may result in a data throughput bottleneck. In one aspect, only a few core compute elements executing the fully-connected (FC) layer in the CNN may need to access this external pool of memory. This is because the FC layers involve a large number of weights as compared to the convolution layers. The data rate requirement at the FC layer is much lower as compared to the data rate requirements in the initial convolutional layers. This allows for multiple core compute elements to utilize this external pool of memory as a shared resource. At the same time, if too many core compute elements start to access this shared memory resource, it will run out of bandwidth. In one aspect, the assumption here can be that only a handful of core-compute modules executing the FC layers would need access to this shared resource. In one aspect, the external pool of memory can be located on chip (e.g., in memory 404 of the PFA chip 400 of FIG. 4). In one aspect, the external pool of memory can be located off chip.

In one aspect, this disclosure involves use of a compiler to map a CNN (e.g., CNN architecture) on a configurable CNN processor. The compiler may implement an algorithm for routing or mapping the CNN. One such algorithm may include:

(1) Input a CNN architecture to be implemented.

(2) Assign each convolution operation in the CNN to a core compute element.

(3) Assess time, including net computation time, for each of the convolution modules by the respective core compute elements assigned to worst case condition.

(4) Assign computation time budget to each of the core compute modules based on a requirement for processing certain frames per second.

(5) For each of the core compute elements that is able to compute well within its time budget, assess if a single core compute module can compute two CNN operations. The total coefficients required may also be taken into consideration while combining the computation of two CNNs into a single core compute element.

(6) For each of the core compute elements that is exceeding the available time budget, split the convolution across two core compute elements such that each of the core compute elements computes only half of the required output volume. Repeat this step until each core compute element can compute its individually assigned task within its timing budget.

(7) In the case of convolutional operations larger than 3×3, a CNN operation could be assigned to more than one of the core compute elements in step (2). In this case, the group of core compute elements representing the CNN operation is taken into consideration in steps (3)-(6).

(8) Input data is loaded into the memory of an intelligent memory buffer and the output is read from an intelligent memory buffer. The entire memory space of the intelligent memory buffer is accessible from 10 devices responsible for communicating to and from the external world of the processor.

The above algorithm describes one way for a compiler to route or map a preselected CNN to a configurable CNN processor, as described herein. In one aspect, this algorithm can be modified to suit other design goals.

CNN Operation

Figure 12:
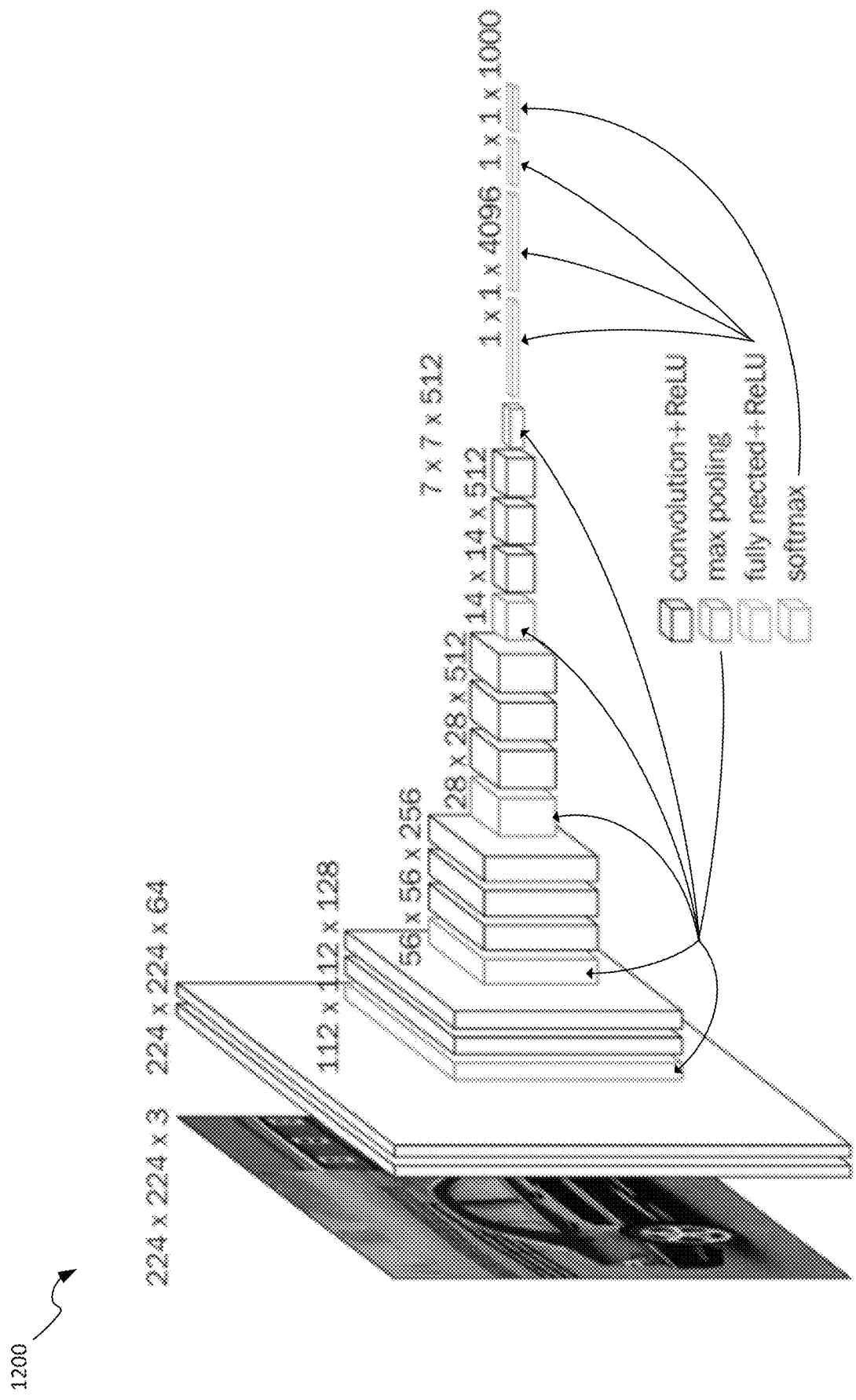
FIG. 12 is a diagram illustrating an example CNN in accordance with some aspects of the disclosure.

FIG. 12 is a diagram illustrating an example CNN 1200 in accordance with some aspects of the disclosure. The CNN 1200 can be a typical CNN. This particular example shows the flow of data and computation along with different computation nodes such as convolution, ReLu, pooling, fully connected layer, and a softmax layer. The computation nodes and their associated memory requirements are subject to the data flow graph of the CNN.

Figure 13:
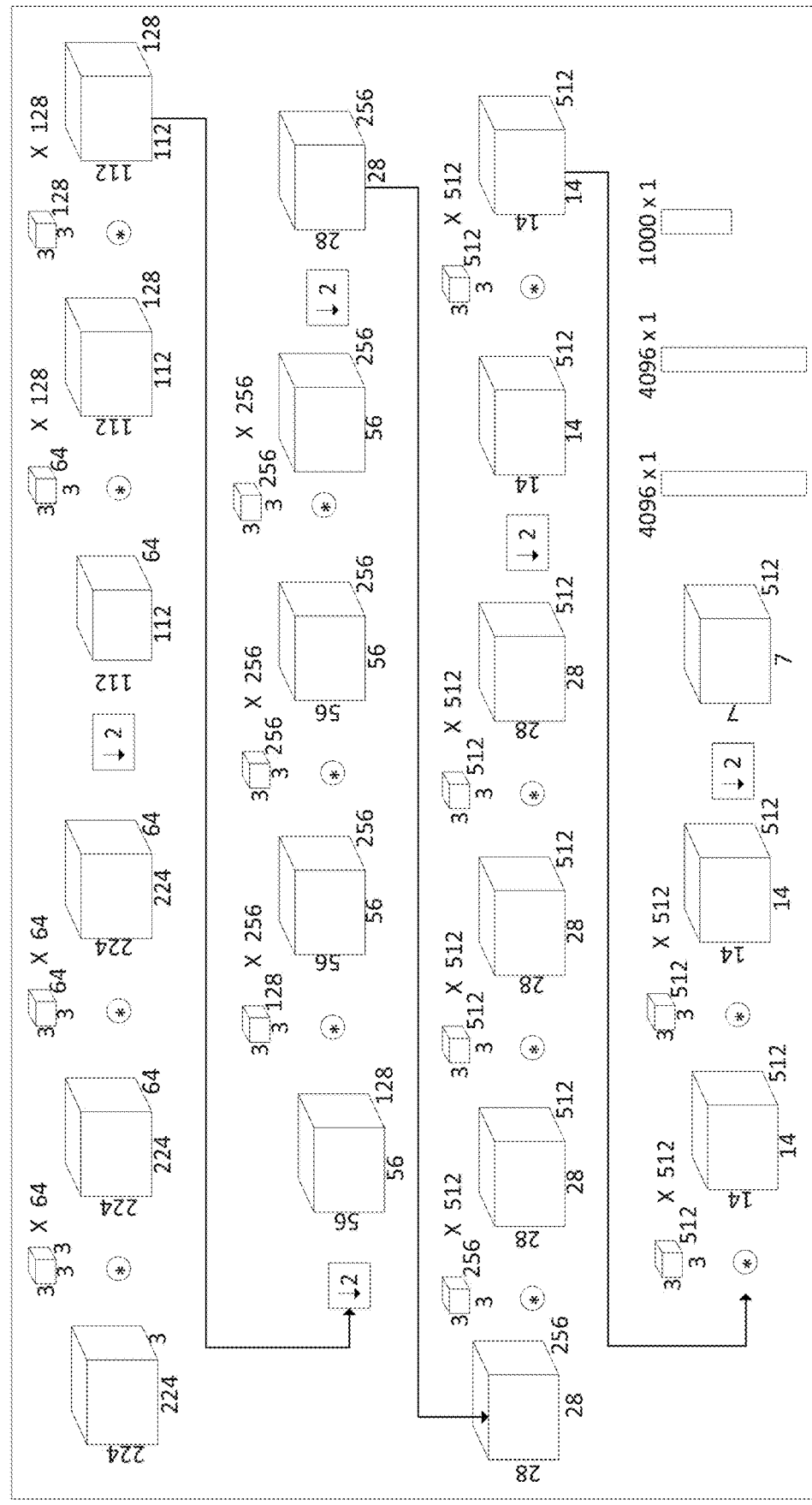
FIG. 13 is a block diagram illustrating the convolution operations of the example CNN of FIG. 12 in accordance with some aspects of the disclosure.

FIG. 13 is a block diagram illustrating the convolution operations 1300 of the example CNN 1200 of FIG. 12 in accordance with some aspects of the disclosure. The bulk of the core computations for the CNN is attributed to the convolutional operations. Similarly, the bulk of the core computations during backpropagation or training of the CNN is also attributed to the convolutional operations.

Figure 14:
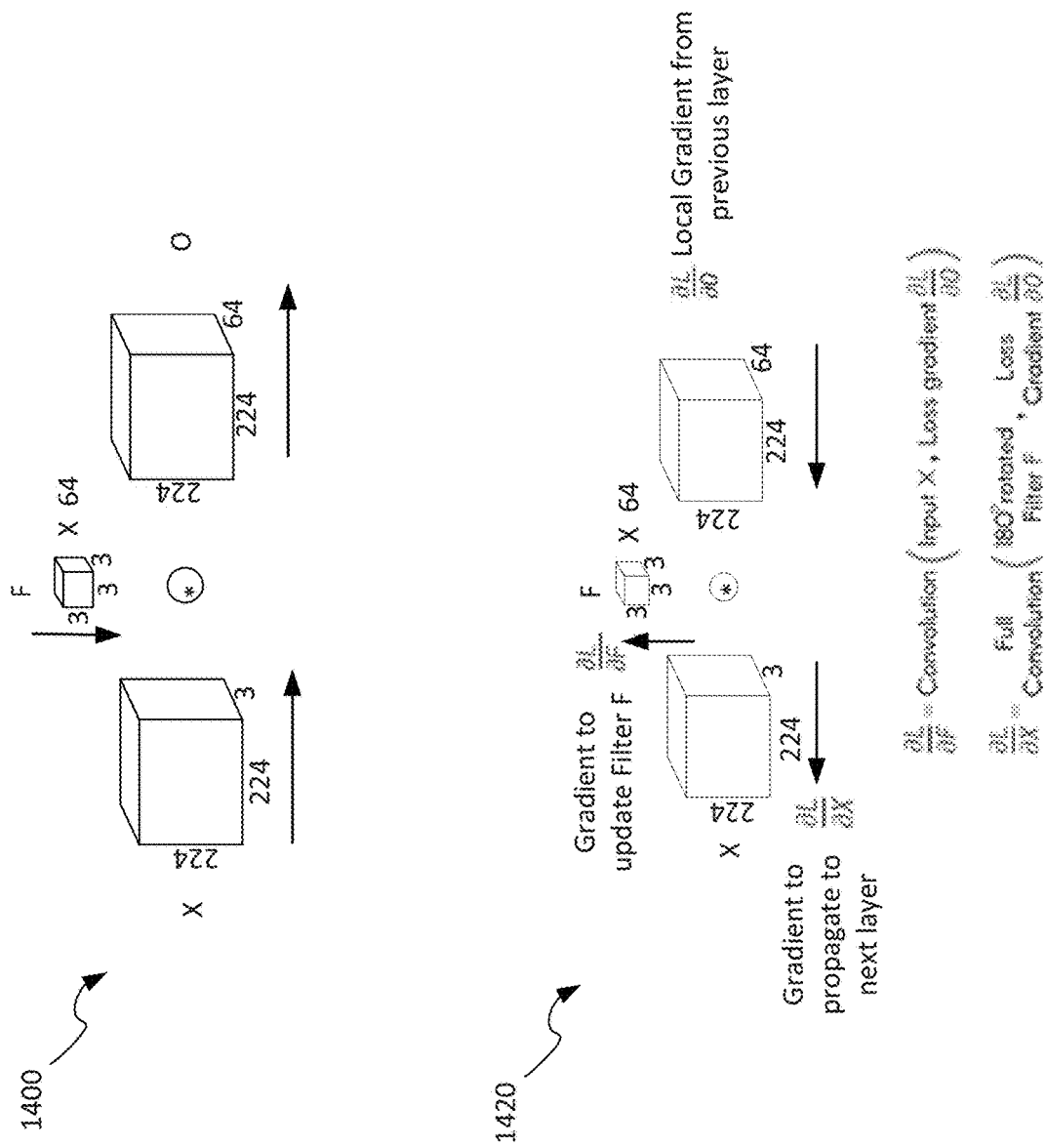
FIG. 14 is a block diagram illustrating the forward path and the backpropagation path of the example CNN of FIG. 12 in accordance with some aspects of the disclosure.

FIG. 14 is a block diagram illustrating the forward path 1400 and the backpropagation path 1420 of the example CNN of FIG. 12 in accordance with some aspects of the disclosure. In the forward path 1400, X denotes the input to a convolution, F denotes the filter weights, and O denotes the output. This is the forward path of the CNN or the inference path.

The computation path during backpropagation is shown by 1420. The equations indicate that the backpropagation path during training the CNN is reduced to convolution operations similar to convolution operations in the inference path. These convolution operations in 1420 can performed by the configurable CNN processor just like the convolutions being performed in the inference path shown in 1400. This allows the same architecture of the configurable CNN processors to be used for both inference and training operations.

The backpropagation path 1420 illustrates some aspects of CNN training. During the training of the CNN, the error derivative from the last stage of the CNN is backpropagated to the first stage of the CNN in the reverse direction of inference. The main aim of the backpropagation algorithm is to compute the error gradient output at every stage and update the weights based on the error gradient propagated to the respective weights. It can be shown that the computation of the gradients flowing from one stage to the other and the respective weight gradients can be approximated with convolution operations. The backpropagation path 1420 describes this graphically.

This means every computation node that computes the inference path can also compute the gradient flow for backpropagation which could be used for training of CNN. Training also includes selecting the correct loss function and the mechanism of updating the weights based on the filter gradients. The configurable CNN processors described herein are intended for, and capable of, both inference and training. The only difference being, while training, more memory may be required to store the intermediate stage results from the inference than are used during backpropagation.

Configurable CNN Processor Mapping Examples

Figure 15:
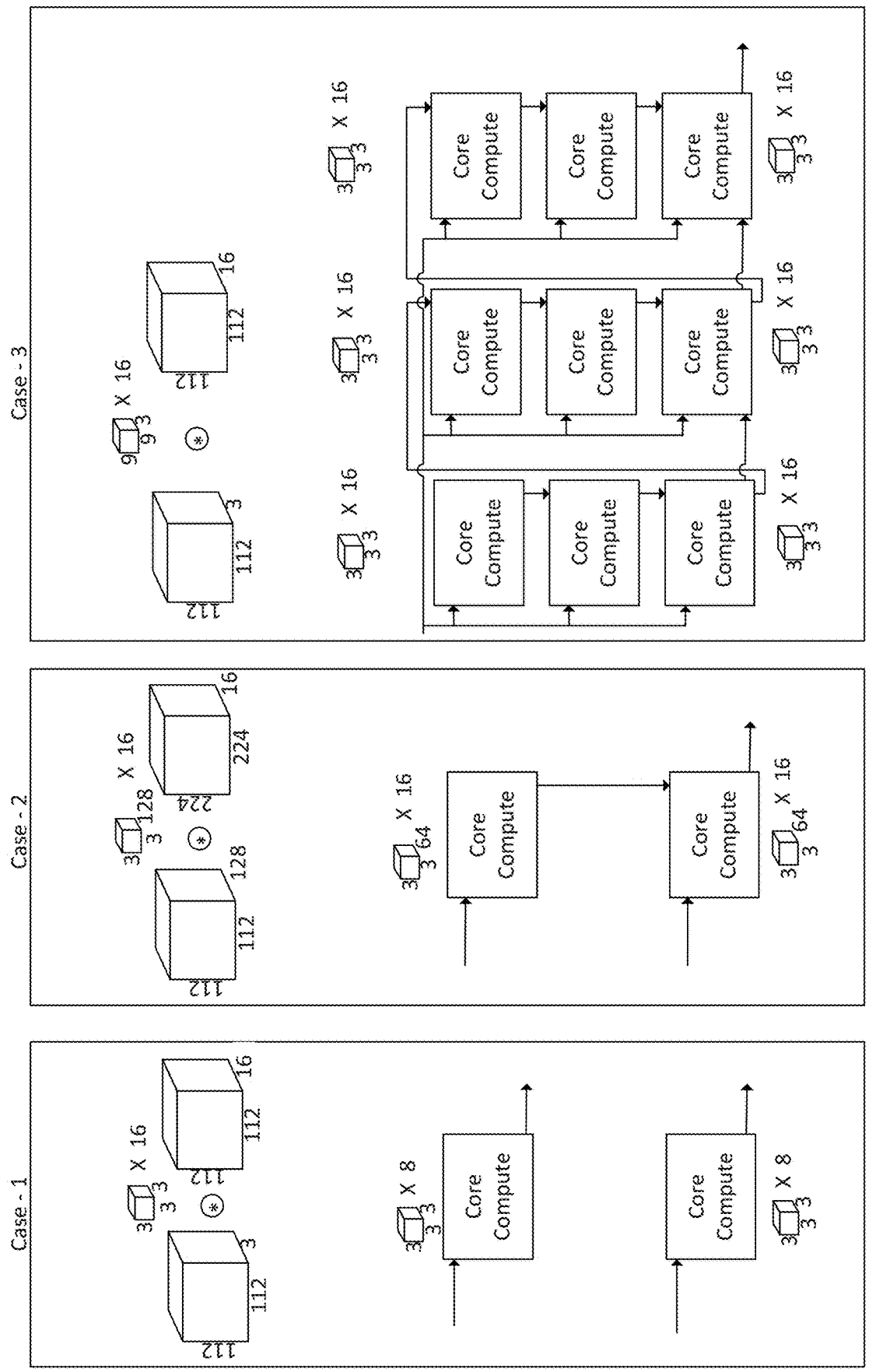
FIG. 15 is a block diagram illustrating three example transformations for mapping a portion of a CNN to core compute elements in accordance with some aspects of the disclosure.

FIG. 15 is a block diagram illustrating three example transformations for mapping a portion of a CNN to core compute elements in accordance with some aspects of the disclosure. FIG. 15 shows three different kinds of transformations (e.g., Case-1, Case-2, and Case-3) that can be used during the mapping of a CNN dataflow graph on to the configurable CNN processors described herein. In FIG. 15, a core compute element is assumed to compute all the necessary computation of a CNN and it is assumed that correct data is passed to it and the appropriate output data is collected correctly from it.

The transformation in Case-1 can be used when a single core compute element cannot meet the required time-to-compute metrics. In such case, a convolutional operation can be split across two parallel core compute elements to work in parallel and generate the required output volume. This scheme uses 2× computational units in the form of two core compute elements and can generate the output volume at half the time of the non-transformed model computed by a single core compute element. It may also require 2× read-ports and 2× write-ports as well in terms of memory resource utilization. The total physical memory usage is unaltered before and after transformation.

The next transformation, Case-2, involves 2× core compute elements and memory read-port resources. However, Case-2 only requires 1× memory write-port resource and an internal communication channel between core compute elements. Each of the core compute elements computes on half the input depth and uses internal communication resources between the two core compute elements. The computed outputs from the two core compute elements may need to be summed up to compose the final output volume. This can be done on the receiving core compute element. One of the write-ports is compensated by the internal communication between the two core compute elements. This transformation becomes very useful when an extra write-port is not available.

The last transformation, Case-3, uses a group of core compute elements to perform convolution greater than filter dimensions 3×3. This example shows a convolution with a filter of dimensions 9×9. Most CNNs use 3×3 or at max 5×5, and very few use 7×7 convolution, let alone 9×9. The 9×9 convolution was chosen as an example in Case-3 since it automatically covers the potential convolutions of lower dimensions. In this example, a 9×9 convolution is carried out by a grid of 9 core compute elements. Overall, it uses one read and one write port in terms of memory resources, while the rest of the communications are carried through the inter core compute communication links (e.g., coupling fabric).

In all the three cases above, data to any core compute element can either be driven by a dedicated memory read port (e.g., of an intelligent/active memory buffer) or multiple core compute elements that share a single memory read port resource.

Figure 16A:
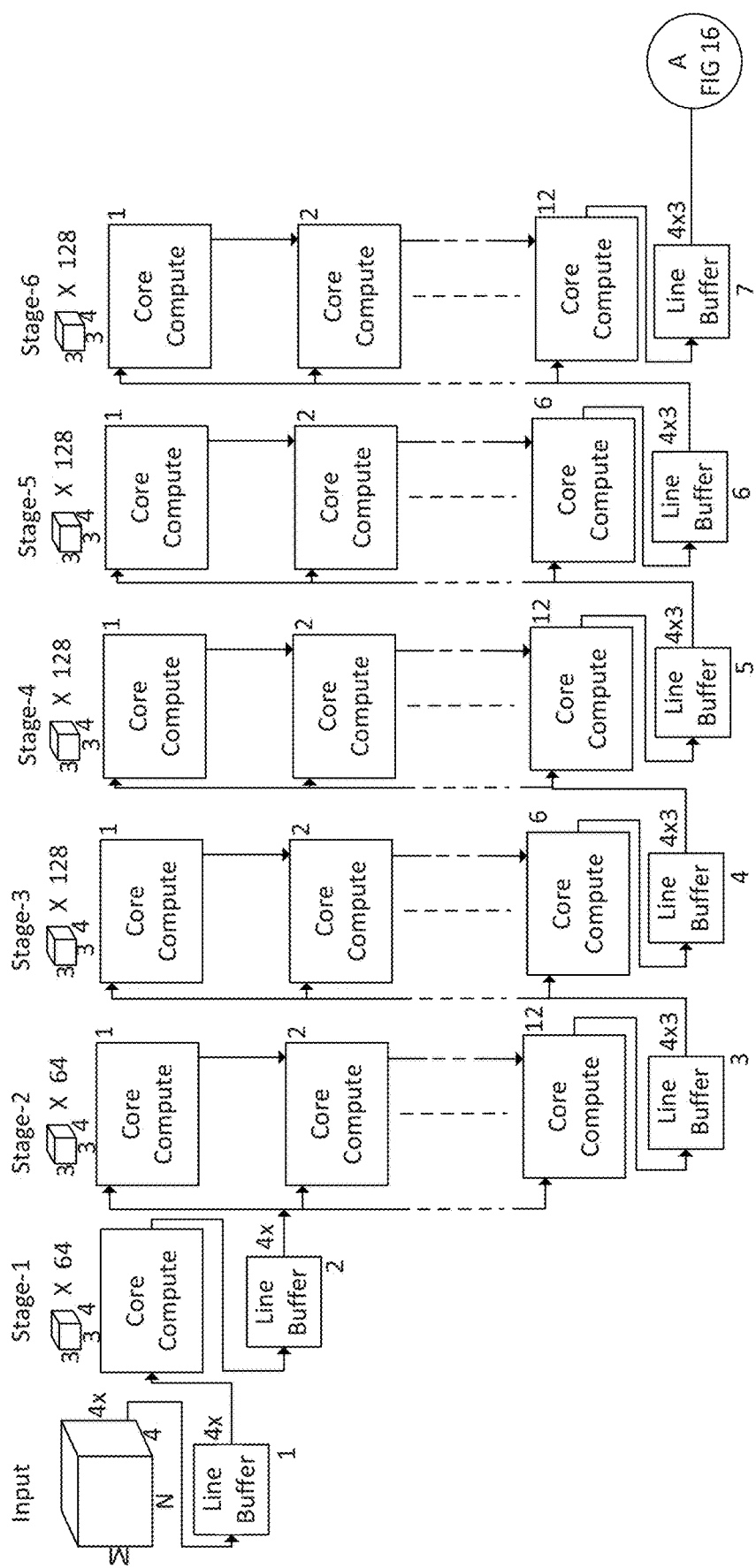
FIGS. 16a and 16b show a block diagram illustrating a possible mapping of the example CNN of FIG. 12 to core compute elements using multiple line buffers in accordance with some aspects of the disclosure.
Figure 16B:
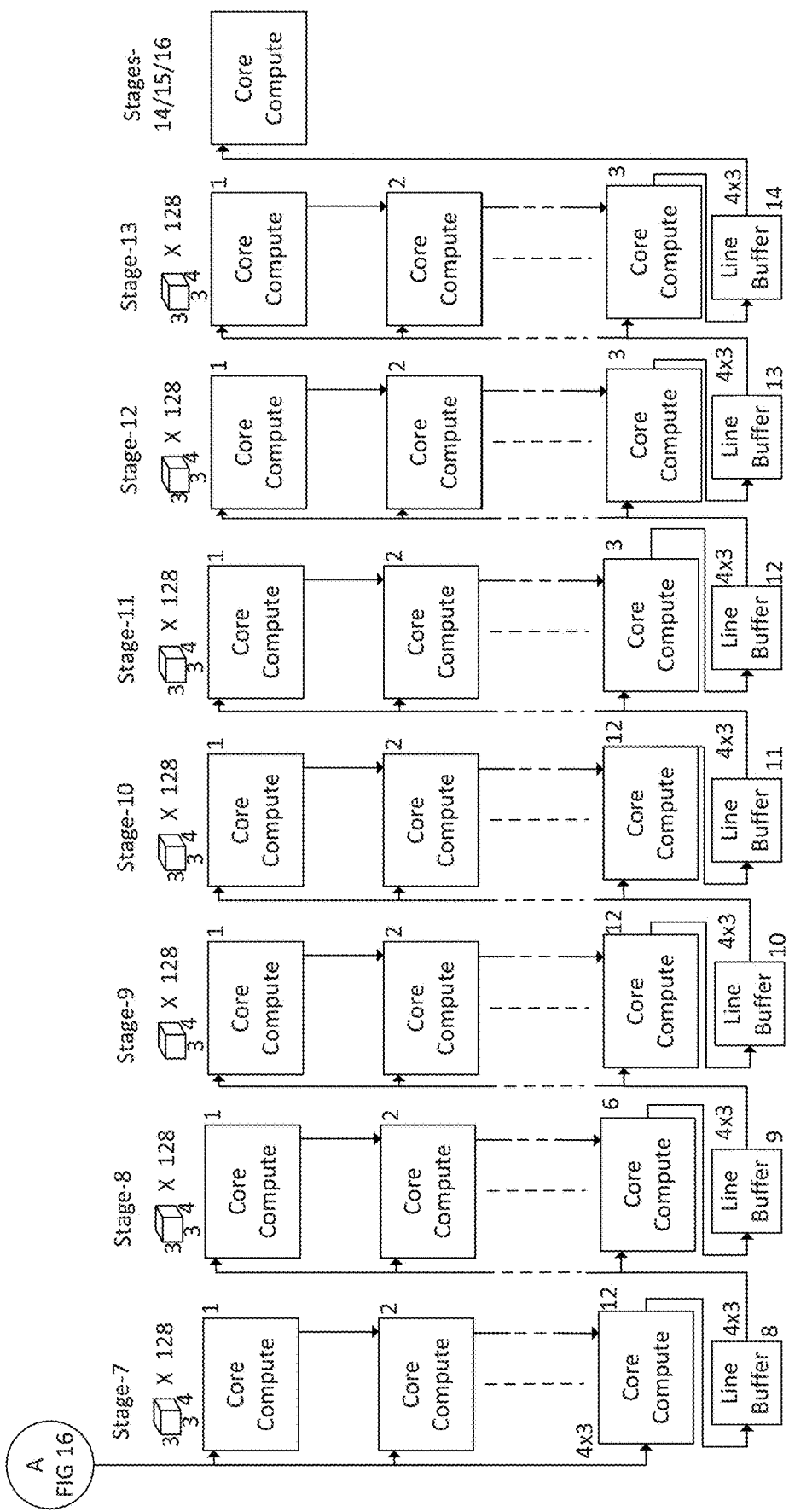

FIGS. 16a and 16b show a block diagram illustrating a possible mapping of the example CNN of FIG. 12 to core compute elements using multiple line buffers in accordance with some aspects of the disclosure. FIGS. 16a and 16b show an example of the CNN introduced earlier, except here, the convolutional operations are distributed across several core compute elements for computing a hypothetical number of frames per second (e.g., a preselected processing requirement). The number of frames to be processed per second dictates the transformations necessary (as described above) at each CNN stage to meet the target data throughput. This results in the number of dedicated core compute modules at each of the CNN stages.

FIGS. 16a and 16b show that line buffers may be needed before every core compute module, and thereby a total number of the line buffer modules that may be involved. Each line buffer contains 3 lines of data along with the depth. To realize any filter of dimension N×N, N line buffers with their depth may be required to support the data requirements of each of the core compute elements. Since here the filters are of dimension 3×3, the line buffers at each stage store 3 lines of data along with the depth. The interconnects between the core compute modules and the line buffers would change for different CNNs based on the connectivity graph that defined the intended CNN to be implemented. One idea behind the configurable CNN processors described herein is to facilitate this connectivity such that, by rearranging the connectivity between the line buffers and the compute modules, different CNN graphs could be realized. Essentially this results in programming or mapping the functional graph of the CNN directly onto the processor.

Figure 17:
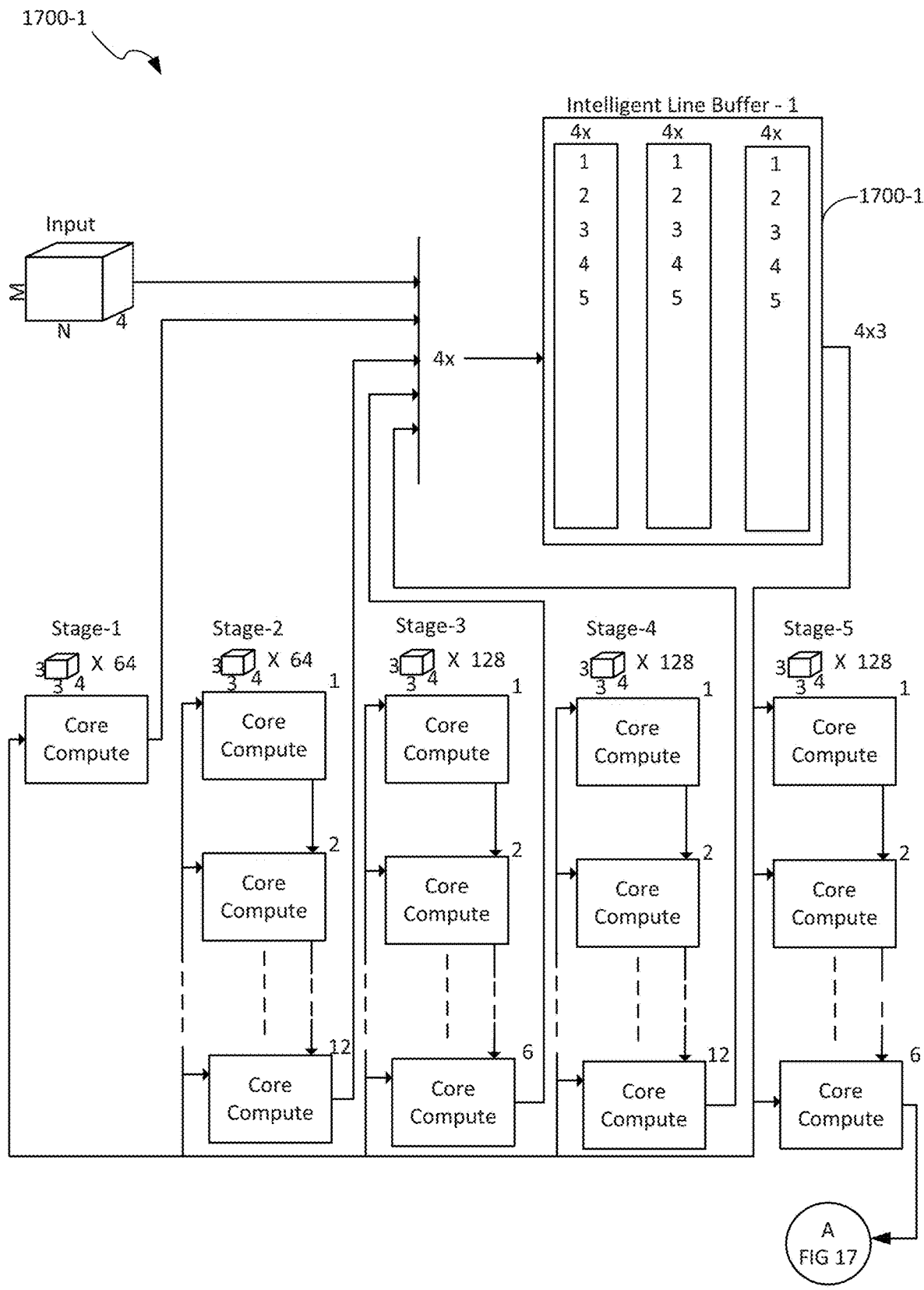
FIGS. 17, 18a and 18b illustrate a single block diagram of a possible mapping of the example CNN of FIG. 12 to core compute elements, where line buffers are aggregated into an active memory buffer, in accordance with some aspects of the disclosure.
Figure 18A:
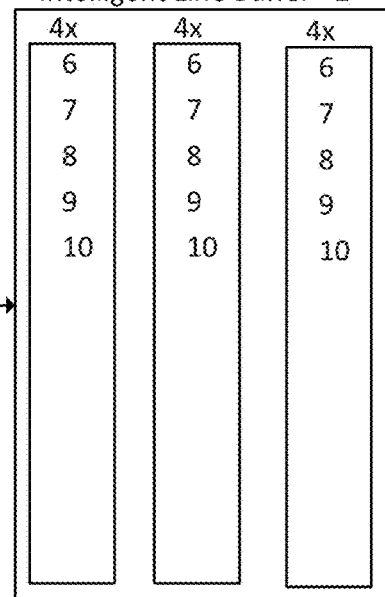
Figure 18A:
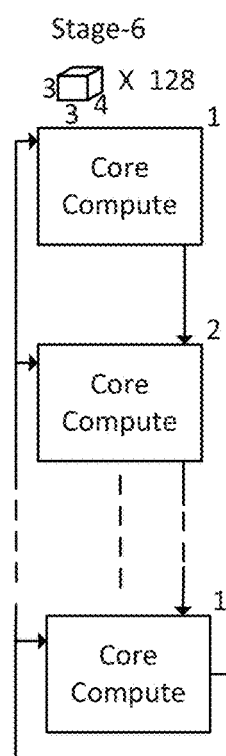
Figure 18A:
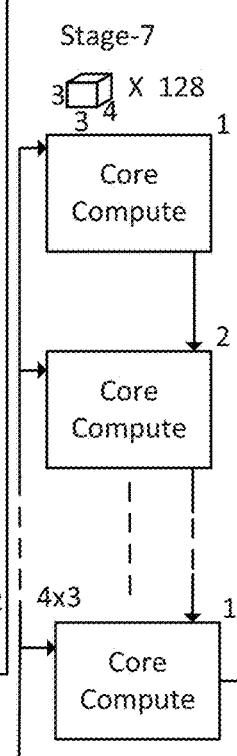
Figure 18A:
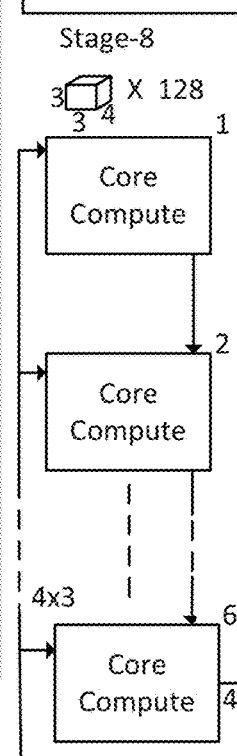
Figure 18A:
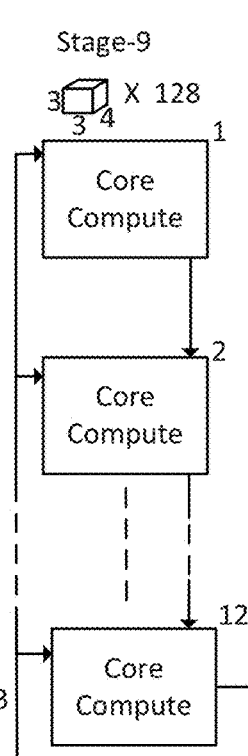
Figure 18B:
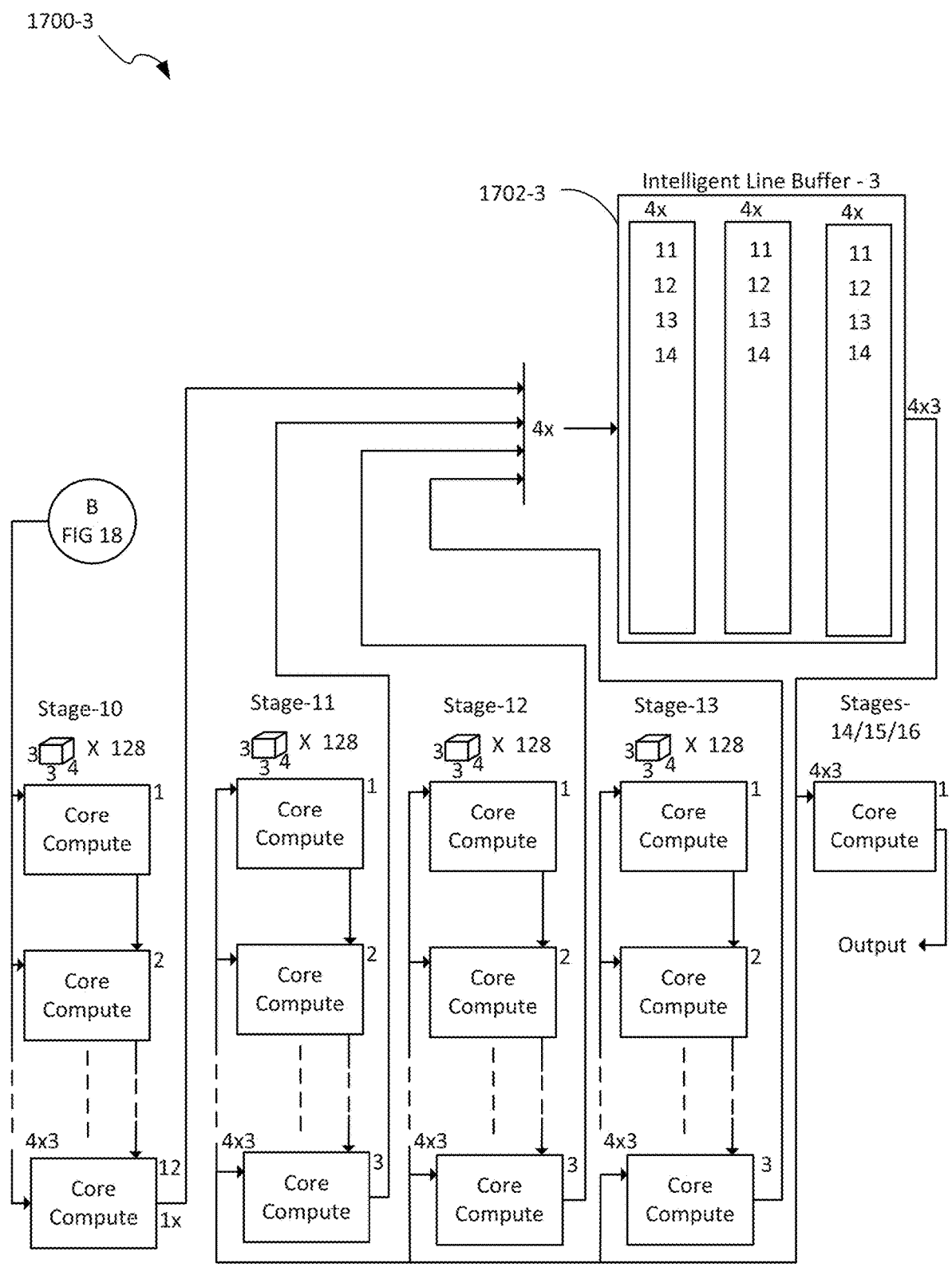

FIGS. 17, 18a, and 18b illustrate a single block diagram of a possible mapping (1700-1, 1700-2, collectively referred to as 1700) of the example CNN of FIG. 12 to core compute elements (e.g., "36-M"), where line buffers are aggregated into an active memory buffer, in accordance with some aspects of the disclosure. In FIGS. 17, 18a and 18b, multiple line buffers are aggregated and placed in a unit called an intelligent memory buffer (e.g., the intelligent memory buffer as described herein) (1702-1, 1702-2, 1702-3, collectively referred to as 1702). The intelligent memory buffers 1702 can be configured to have contiguous memory that can accommodate a certain number of line buffers along with their depth based on the configuration of the line buffers. In one aspect, it can be assumed that the intelligent memory buffers 1702 would have a certain number of write-ports and a certain number of read-ports.

Under certain conditions, it may appropriate to assume the following:

(1) Given the technology node of the processor implementation, the processor could be running at speeds that are orders of magnitude higher than the input data rate to be computed. As an example, real-time motion may have a frame rate of 30 frames per second, where a 400×400×3 sized image has a data rate of approximately 14.5 megapixels per second, and when compared to a configurable CNN processor, as described herein, running at 1 GHz, the order of difference in speed is approximately 70 times (e.g., the configurable CNN processor is running at 70× the data rate of the real-time motion data source). This difference in data rate between the computation engine and a target data processing rate can be easily extended to every stage of the CNN, aided by the convolution transformations described earlier. In such case, every stage will end up with a respective target data processing rate and the processing rate of the hardware compute elements such as the intelligent memory buffer and the core compute elements. As a result, at each stage of the CNN, the memory and core compute elements could be configured to operate at a much higher rate than the target processing rate.

(2) Under the above assumption, where the operating speed of each intelligent memory buffer and the core compute element is higher than the target processing rate, it is fair to conclude that an intelligent memory buffer can easily multi-task. In our case of the intelligent memory buffer, the internal memory where the data is stored, could easily multi-task to service multiple core compute elements with data read and write requirements through multiple read and write ports. One example is where the core memory of the intelligent memory buffer is a dual-port contiguous memory and the intelligent memory buffer supports 8 read-port and 8 write-port simultaneously. In other words, on average and at maximum throughput capacity, the intelligent frame buffer can service each of the read and write ports every 8 clocks, for this example.

(3) Each of the core compute elements may be configured to use more than 8 clocks to compute it's assigned tasks. In one aspect, this may increase by orders of magnitude higher when there are several filters to compute in parallel. This is perfect for the intelligent memory buffer as it can multitask between different core compute elements without being a bottleneck in supplying data to the core compute elements. In one aspect, this ability to time multiplex enables the intelligent memory buffer to serve multiple read and write ports and maintain data coherency between multiple core compute elements while operating under the constraint of a low-power implementation. This strategy can ensure that data for convolution can be read optimally and can avoid all extra read operations, such as those required in the case of a cache-based memory hierarchy system.

(4) In the latest technology implementations, any memory operation such as a read or write may consume much more power than simple arithmetic operations such as addition, subtraction, or multiplication. Therefore, one useful strategy leveraged here may be to minimize read/write operations to the memory and to maximize the total number of computations per clock. In one aspect, the intelligent memory buffer is responsible for feeding each of the core compute elements with data, followed by the core compute element using several clocks to consume the data to produce meaningful results. By encapsulating all memory read/write operations within the intelligent memory buffer and by performing optimal read and write operations, the configurable CNN processor can minimize memory read/write power consumption. In a convolution operation, data is processed in a chunk reflecting the size of the convolution. As an example, in one aspect, a 3×3×16 convolution with 128 parallel filters at a CNN stage would require a data chunk of 3×3×16 for the core compute element to compute, and after computing the 128 data points corresponding to the 128 parallel filters (e.g., one for each parallel filter), would then need to consume the next chunk of 3×3×16 data to generate the next set of 128 output points. If the convolution is a 1×1 convolution, then each set of 3×3×16 data points are unique. However, in this case, since it is a 3×3 filter, this results in overlapping data points between subsequent 3×3×16 data blocks. FIG. 7 shows the various modes that are supported. This can prevent repetitive data read operations. However, in this example, there is an overlap of 2×3×16 and only 1×3×16 new data points (e.g., Mode-3 in FIG. 7) may be required to be read from the intelligent memory buffer. However, if the filter was of size 1×1 instead of 3×3, then this example would be similar to Mode-1 in FIG. 7. This ensured optimal memory read operations, thereby ensuring optimal read power.

(5) In one aspect, to perform convolution at any given time, only the number of row-data equal to the filter dimension may be required to start computing on the input frames. For example, a 3×3 convolution would only require the 3 lines along with the depth data points to be stored at any given time, which then gets overwritten by the next incoming row data and then the next. The contiguous memory in the intelligent memory buffer can allow for optimizing the use of a total number of line buffers needed to be stored at any given time, and at the same time can offer a shared resource between a number of core compute elements through the read and write ports. At the same time, this provides the option for storing the entire frame data within the memory module. This can either be used for debugging or used for CNN networks that involve intermediate storage of the entire frame being used at a later point in time. This gives the flexibility to the intelligent memory buffer to adapt to any required dimension of the data at any CNN stage, of course within the bounds of the total memory. For instance, based on the size of the total memory available in an intelligent memory buffer, the compiler at compile-time can determine the number of CNN convolutions that could be supported by a single intelligent memory buffer. This decision is also influenced by the required data processing rate.

(6) In one aspect, the intelligent memory buffer can be viewed as a core component of the configurable CNN processor. It is responsible for providing the core compute elements with data and is also responsible for writing back the computed results from the core-compute elements back to the memory for the next convolution module.

(7) In one aspect, there are several core compute elements per read-port of the intelligent memory buffer and each of the core compute elements only has access to a set of the write-ports of the intelligent memory buffer. The connectivity between the intelligent memory buffer and the core compute elements is determined based on the dataflow graph of a CNN to be implemented. This may be determined at compile-time, which eliminates the need for dynamically changing this connectivity between the modules at runtime for a given CNN. This fixed connectivity significantly reduces power consumption which otherwise would be consumed by constant switching of the connectivity and the mechanism to store instructions to change the connectivity at runtime, which is typical of a conventional processor using the instruction set architecture.

Figure 19:
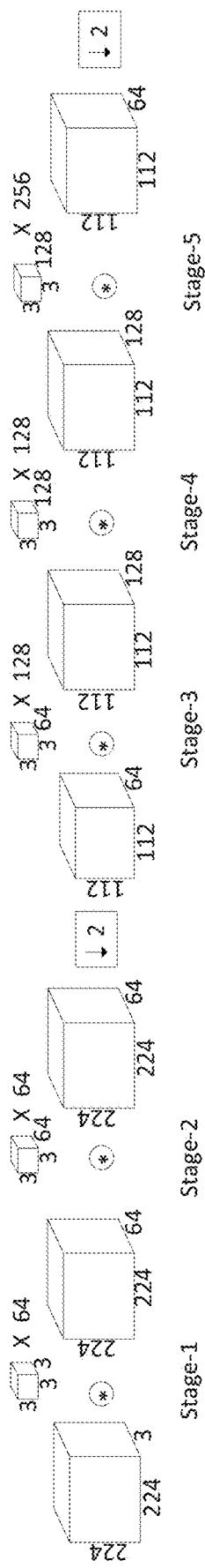
FIG. 19 is a block diagram illustrating a first example CNN to be mapped to a configurable CNN processor in accordance with some aspects of the disclosure.

FIG. 19 is a block diagram illustrating a first example CNN (Case 1) to be mapped to a configurable CNN processor in accordance with some aspects of the disclosure.

Figure 20:
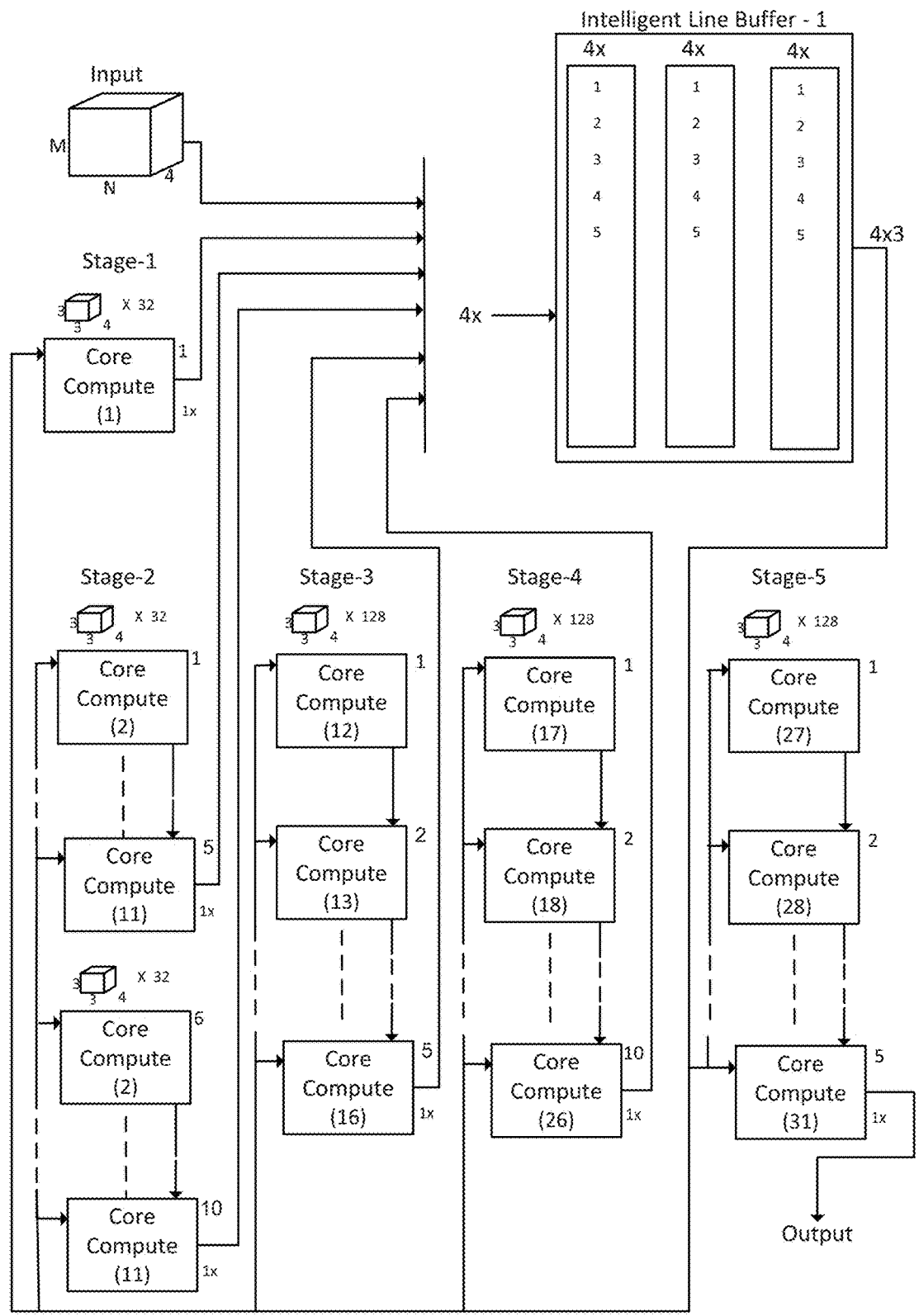
FIG. 20 is a block diagram illustrating a resulting mapping of a configurable CNN processor using the first example CNN of FIG. 19 in accordance with some aspects of the disclosure.

FIG. 20 is a block diagram illustrating a resulting mapping of a configurable CNN processor (Case-1) using the first example CNN of FIG. 19 in accordance with some aspects of the disclosure. In one aspect, FIG. 20 can be view as an example of mapping an example CNN dataflow graph using convolution transformation Case-1. The example of FIGS. 19 and 20 is intended to highlight the use of transformation shown in Case-1 of FIG. 15. FIG. 20 shows, in Stage-2, that the CNN of FIG. 19 has been split across 10 core compute elements to meet a certain hypothetical data rate. In Stage-3 in FIG. 20, the core compute elements have been split into two parts each computing 32 parallel filters (e.g., a total of 64 total output channels and computed over 5 core-compute modules).

Figure 21:
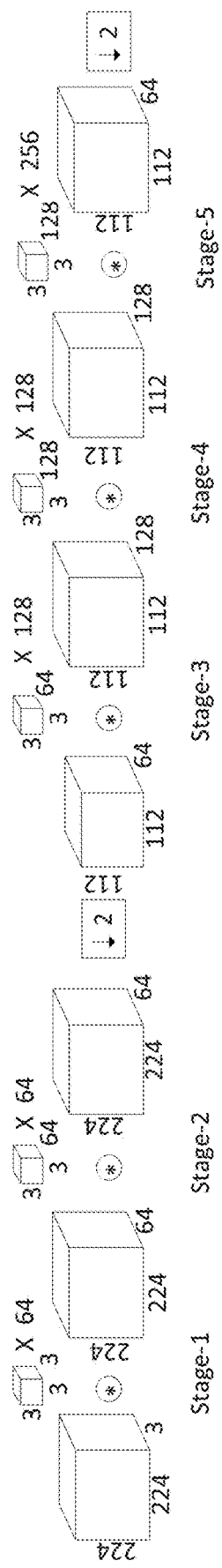
FIG. 21 is a block diagram illustrating a second example CNN to be mapped to a configurable CNN processor in accordance with some aspects of the disclosure.

FIG. 21 is a block diagram illustrating a second example CNN (Case-2) to be mapped to a configurable CNN processor in accordance with some aspects of the disclosure.

Figure 22:
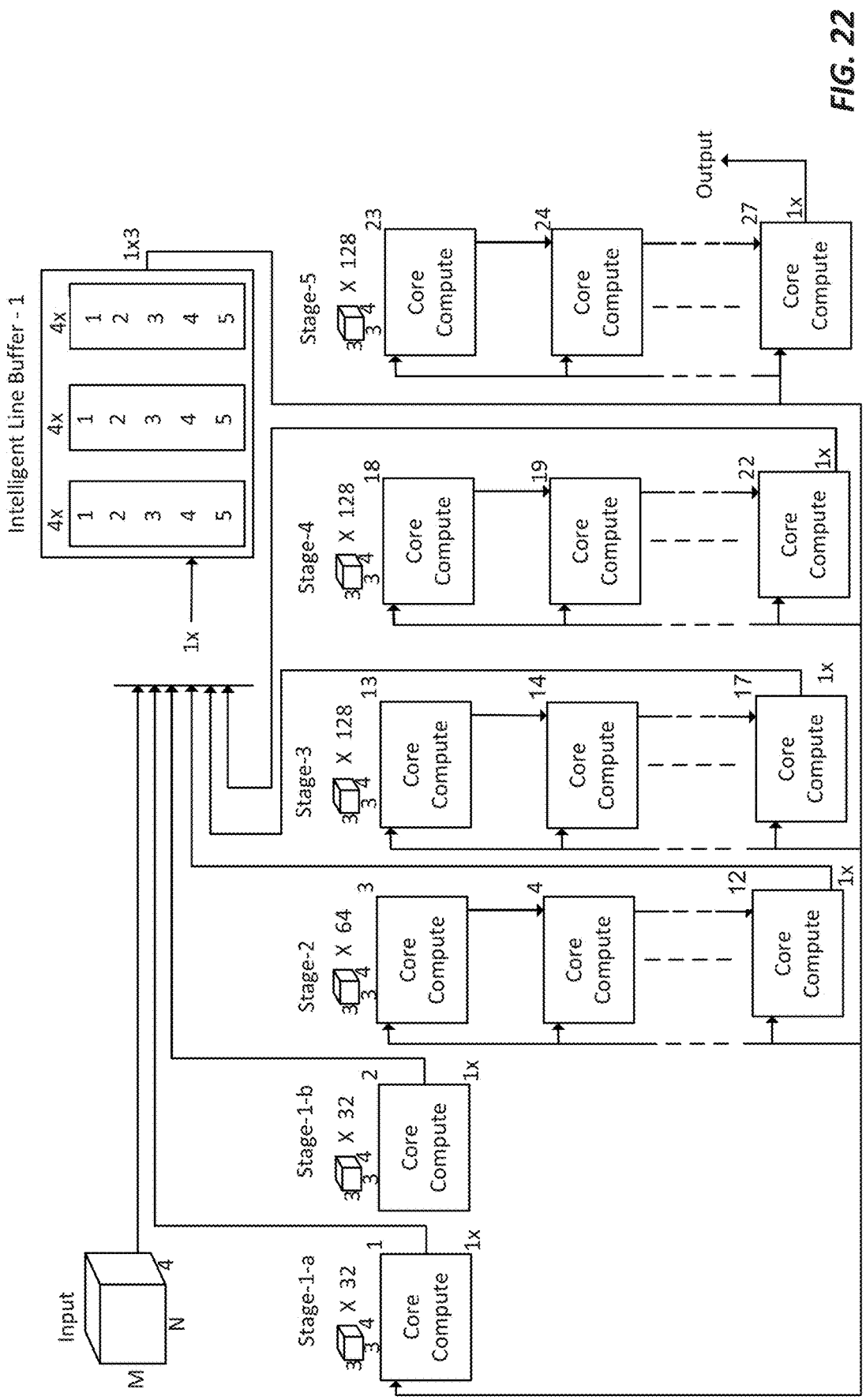
FIG. 22 is a block diagram illustrating a resulting mapping of a configurable CNN processor using the second example CNN of FIG. 21 in accordance with some aspects of the disclosure.
Figure 23:
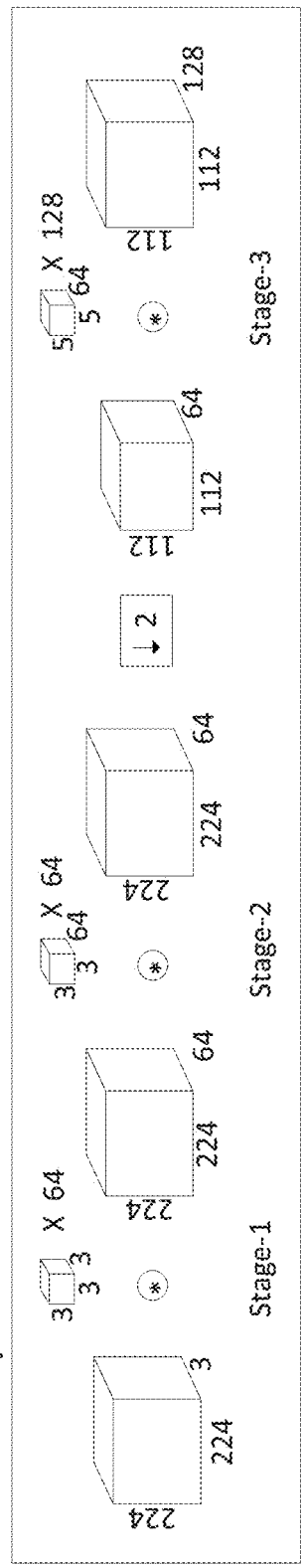
FIG. 23 is a block diagram illustrating a third example CNN to be mapped to a configurable CNN processor in accordance with some aspects of the disclosure.
Figure 24:
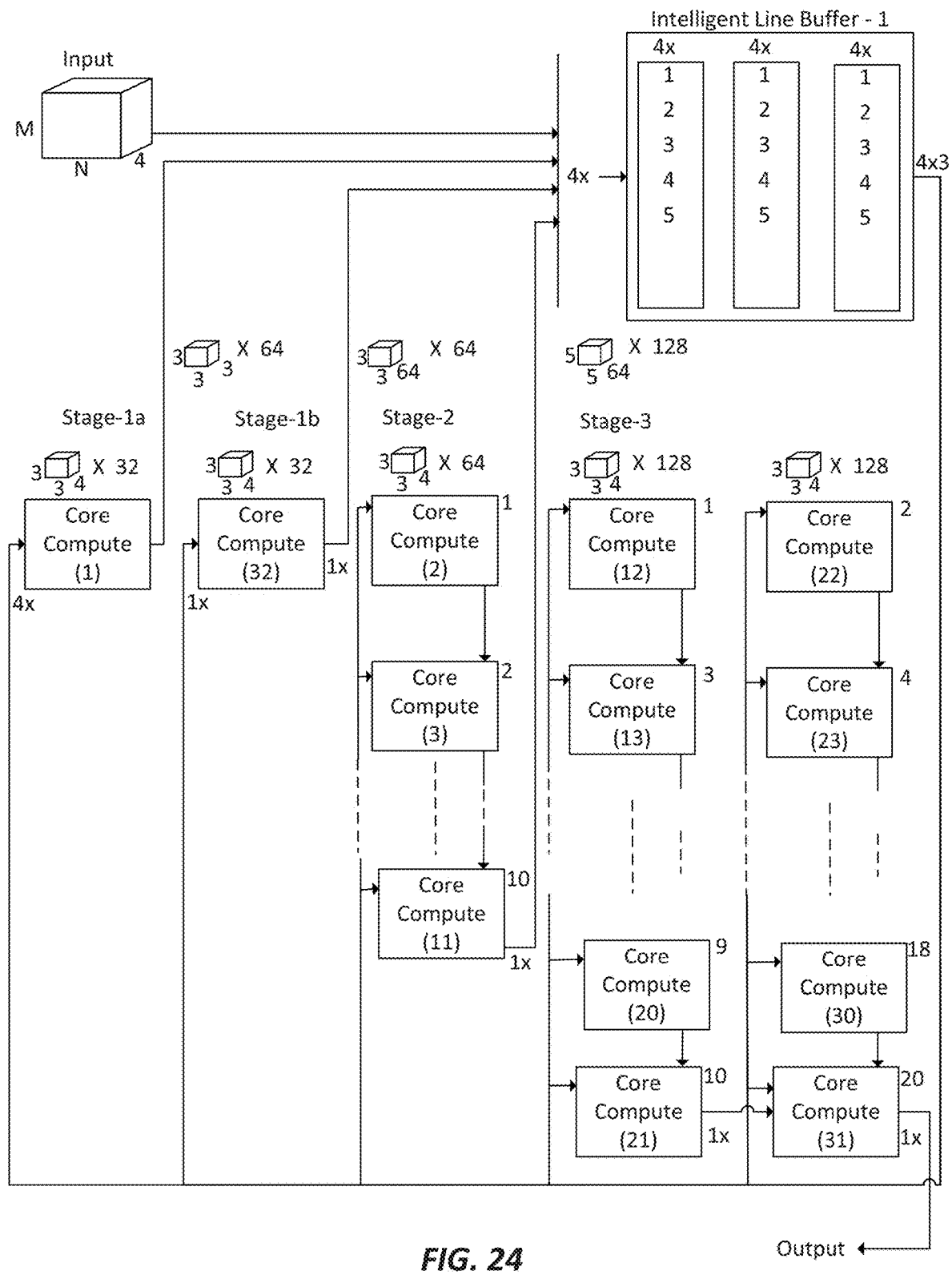
FIG. 24 is a block diagram illustrating a resulting mapping of a configurable CNN processor using the third example CNN of FIG. 23 in accordance with some aspects of the disclosure.

FIG. 22 is a block diagram illustrating a resulting mapping of a configurable CNN processor (Case-2) using the second example CNN of FIG. 21 in accordance with some aspects of the disclosure. FIG. 22 can be viewed as a mapping of an example CNN dataflow graph using the convolution transformation Case-2. The example of FIGS. 19 and 20 is intended to show the transformation of Case-1, and the example of FIGS. 21 and 22 is intended to show transformation of Case-2, and the example of FIGS. 23 and 24 is intended to show the transformation of Case-3. Stage-2 of the CNN shown in FIG. 22 demonstrates the transformation of case-2 shown in FIG. 15. The differences between the two transformations is clearly visible in FIG. 20 and FIG. 22. More specifically, stage-2 in FIG. 20 uses an extra write port in the intelligent memory buffer while the implementation of FIG. 22 utilizes more inter core-compute module communication resources.

FIG. 23 is a block diagram illustrating a third example CNN (Case-3) to be mapped to a configurable CNN processor in accordance with some aspects of the disclosure.

FIG. 24 is a block diagram illustrating a resulting mapping of a configurable CNN processor (Case-3) using the third example CNN of FIG. 23 in accordance with some aspects of the disclosure. FIG. 24 can be viewed as an example of mapping an example CNN dataflow graph using the convolution transformation Case-3. Stage-3 in FIG. 24 demonstrates the use of transformation shown in Case-3 in FIG. 15. Stage-3 uses a 5×5 convolution. The 5×5 convolution is spread across 2×2 array of the core compute element. Essentially the hardware is implementing a 6×6 convolution. A higher order can always implement a lower order filter with zeros inserted. Stage-3 in FIG. 24 implements not only transformation shown in Case-3, but also combines with the transformation shown in Case-2.

Use Cases Incorporating Configurable CNN Processors

Figure 25:
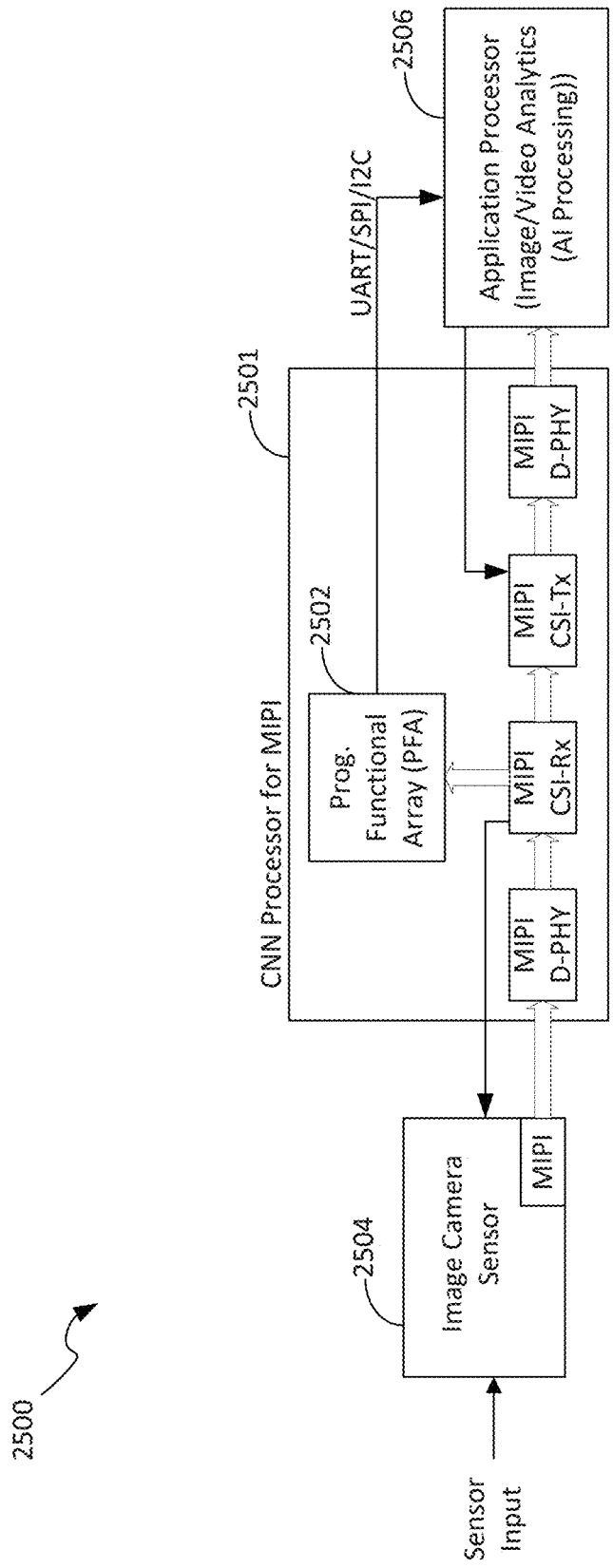
FIG. 25 is a block diagram illustrating a first use case of a configurable CNN processor in a MIPI application in accordance with some aspects of the disclosure.

FIG. 25 is a block diagram illustrating a first use case 2500 of a configurable CNN processor in a MIPI application 2501 in accordance with some aspects of the disclosure. MIPI or Mobile Industry Processor Interface is a technical specification for the mobile ecosystem, particularly smart phones but including other mobile industries. The Camera Serial Interface (CSI) is a specification of the Mobile Industry Processor Interface (MIPI) Alliance. It defines an interface between a camera and a host processor. Aspects of MIPI are incorporated into various components of FIG. 25.

This disclosure describes systems that can process data in general and generate analytics. One of the example applications is to process image/video data. Analytics could be in the form of tasks such as object detection/recognition from a scene, image enhancement from low lighting conditions or any form of intelligent tasks that are intended to be computed either on a frame by frame basis or on a group of frames defined as a video sequence. Recognition of video sequence could include temporal dependencies such as action recognition, etc.

FIG. 25 describes one such CNN processor configured for MIPI 2501 that inputs image sensor data 2504, processes it at programmable functional array (PFA) 2502 (e.g., after receiving it via MIPI D-PHY and MIPI CSI-Rx), and has the option (1) to send the computed analytics over a standard communication bus such as SPI, UART, I2C, or another such interface to an application processor 2506 or (2) to directly embed the computed data on the MIPI-CSI output bus (e.g., into packets sent via MIPI CSI-Tx and MIPI D-PHY at output). The MIPI D-PHY is a physical layer component that is used primarily to interconnect cameras and displays to an application processor, and is defined by the MIPI Alliance. The MIPI CSI (including the MIPI CSI-Rx or receiver component and the MIPI CSI-Tx or transmitter component) is a camera serial interface that is used primarily to interconnect the camera in a device to the application processor or image signal processor, and is defined by the MIPI Alliance.

The processed analytics of the PFA/CNN sub-processor 2502 could be provided in two forms. In one form, the output analytics can be defined by a few data-words such as a classification result, and in that case could be sent to the application processor 2506 via a standard serial communication bus (SPI, UART, I2C), including the I2C bus as part of the MIPI standard. In the other form, the processed output can consist of a significant amount of output data which is transmitted via the MIPI-CSI bus (e.g., the main data bus). In this case, the PFA/CNN sub-processor 2502 can embed the analytics directly on to the MIPI-CSI data and the application processor 2506 extracts the analytics from the MIPI-CSI bus. This results in a highly optimized system for transporting data between CNN processor 2501 and the application processor 2506. The overall power of the system can be minimized by eliminating the need for an application processor 2506 to transfer data specifically to the CNN processor 2501. This further reduces the overall system latency. In sleep mode, the default dataflow path is from the input to the output of the MIPI-CSI bus, bypassing the PFA/CNN sub-processor 2502. This ensures that power, for the CNN processor 2501, is consumed, or is primarily consumed, only when the PFA/CNN sub-processor 2502 is used to compute. In one aspect, the MIPI bus can be implemented using a flexible cable. In such case, the CNN processor 2501 can be disposed serially along the bus, and along the cable. In one aspect, the CNN sub-processor 2502 can be implemented using any of the PFAs described herein. In one aspect, the CNN sub-processor 2502 can be implemented using a traditional instruction set architecture processor (e.g., load/store processor), such as those described above.

In one aspect, the CNN sub-processor 2502 can receive image data from the image camera sensor 2504 via MIPI. The CNN sub-processor 2502 can then generate processed data based on the image data. The processed data can take the form of analytics or other statistics. The CNN sub-processor 2502 can then provide the processed data to the application processor (e.g., on the MIPI bus or on the SPI/I2C/UART bus).

Figure 26:
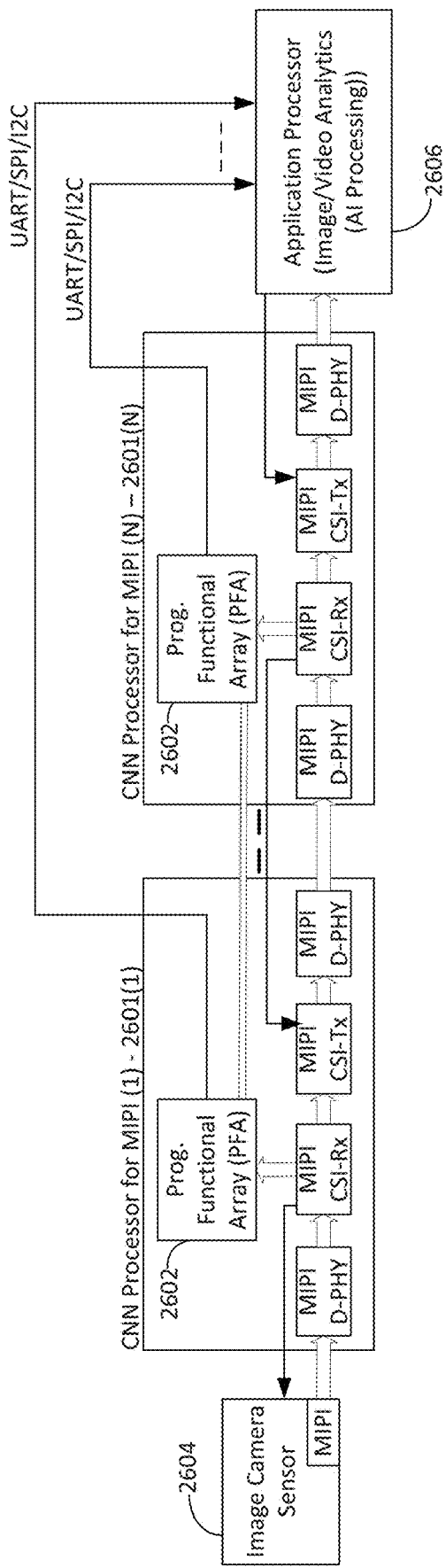
FIG. 26 is a block diagram illustrating a second use case of a configurable CNN processor in a MIPI application in accordance with some aspects of the disclosure.

FIG. 26 is a block diagram illustrating a second use case 2600 of a configurable CNN processor (2601(1) to 2601(N), collectively referred to as 2601) in a MIPI application in accordance with some aspects of the disclosure. FIG. 26 describes an implementation where multiple configurable CNN processors 2601 are cascaded in series on the MIPI bus between an image camera sensor 2604 and an application processor 2606. This implementation provides the flexibility to compute a larger image analysis function which may be difficult or impossible to compute using a single CNN processor (e.g., as seen in FIG. 5). In one aspect, the second use case 2600 operates substantially the same as the first use case 2500, except with multiple CNN processors 2601 that each include a PFA/CNN sub-processor 2602. In another aspect, multiple CNN processors, coupled in series, could implement a unique application in each of the CNN processors of 2601. This use case allows for implementing multiple CNNs in cascade with very minimal latency between the start of each of the CNN computations as the input data reaches the CNN processors over the MIPI bus with very little delay as data flows through each of the CNN processors.

Each of the CNN processors 2601 is sitting on the MIPI bus and has a passthrough of the MIPI bus from input to output. Each is reading data from the MIPI bus as well as causing or enabling the flow of the MIPI data from the input to the output with very minimum latency between the input arrival and output valid. As compared to the first CNN processor 2601(1) from the input, this allows the downstream CNN processors 2601(x to N) to start processing on the incoming image data without any latency compared to a system where the application processor was transmitting data to each of the CNN co-processors over direct memory transfer (DMA). Such a system would likely need to have multiple DMA channels in parallel, which would be expensive in terms of power and area. The alternative is to use single-channel DMA and transmit data to each of the co-processors serially, which is a time-consuming process, and there would be significant latency between the start time of one CNN co-processor versus start time of another.

Figure 27:
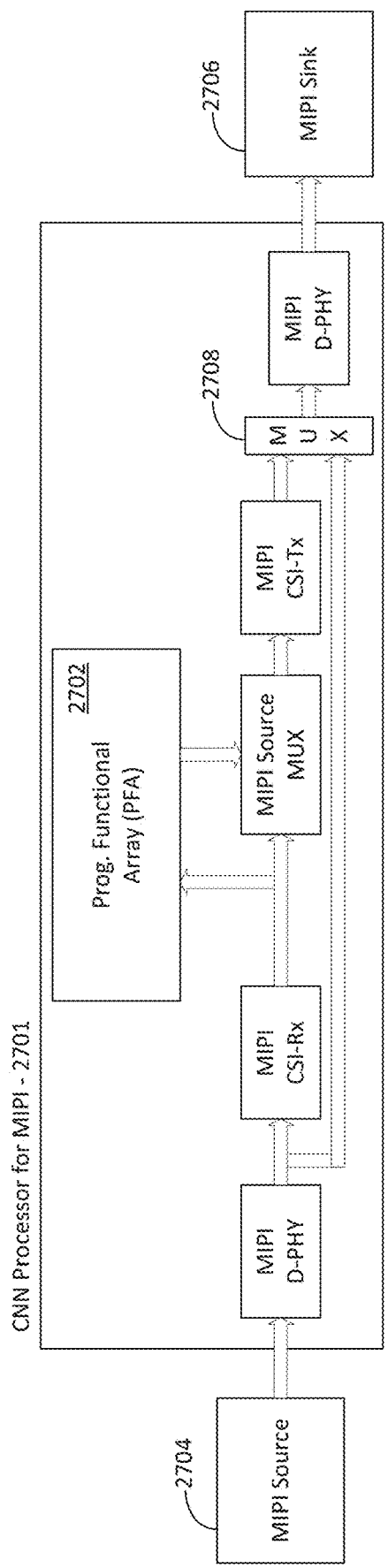
FIG. 27 is a block diagram illustrating a third use case of a configurable CNN processor in a MIPI application in accordance with some aspects of the disclosure.

FIG. 27 is a block diagram illustrating a third use case 2700 of a configurable CNN processor 2701 in a MIPI application in accordance with some aspects of the disclosure. FIG. 27 shows how the MIPI bus, beginning with the MIPI source 2704, could bypass a PFA (e.g., configurable CNN sub-processor) 2702 and send data directly to the application processor, via the MIPI sink 2706, while at the same time, the configurable CNN sub-processor 2702 could process the MIPI data in parallel. This is made possible, at least in part, by the use of the multiplexer 2708.

Figure 28:
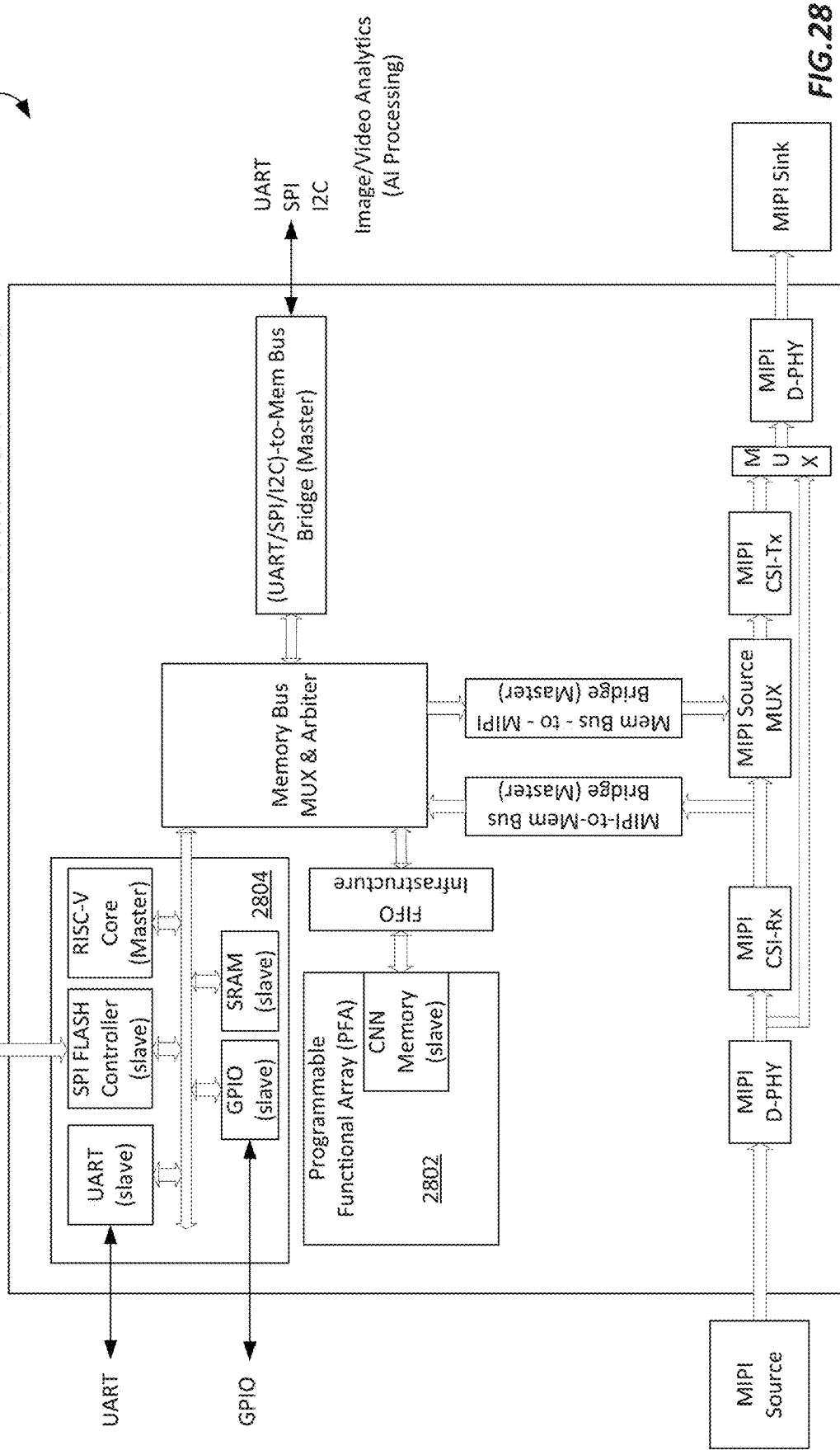
FIG. 28 is a block diagram illustrating a fourth use case of a configurable CNN processor in a MIPI application in accordance with some aspects of the disclosure.

FIG. 28 is a block diagram illustrating a fourth use case 2800 of a configurable CNN processor 2801 in a MIPI application in accordance with some aspects of the disclosure. FIG. 28 is a more detailed diagram showing the internal architecture of the configurable CNN processor 2801. The CNN processor 2801 includes a configurable PFA/CNN sub-processor 2802, a microcontroller (RISC-V as illustrated) 2804, the MIPI sub-system, and standard IO such as UART, GPIO, SPI, and I2C. All memory in the system (both the CNN sub-processor and the RISC-V microcontroller) can be memory-mapped and can be accessible by different masters driving the internal memory bus. The programming of the PFA/CNN sub-processor 2802 can be done in one of two different modes: (1) by the internal microprocessor configuring the CNN processor from the SPI FLASH, or (2) by the application processor (not shown but likely coupled to the MIPI sink) through standard IO interfaces such as SPI, I2C, and UART that are master devices on the memory bus. In the second mode, the SPI FLASH can be eliminated. The RISC V internal processor 2804 is responsible for different housekeeping functions and can also be used for computation when required. It keeps track of the state of the CNN sub-processor 2802 for interfacing with the outside world. Lastly, the RISC-V 2804 can also handle any kind of exceptions that may occur in the system at runtime in a flexible way. In one aspect, the RISC-V processor can be an instruction set architecture controller covered by an open source license, making the processor easy to adopt.

In one aspect, the configurable CNN processor 2801 of FIG. 28 can be viewed not as a different use case, and just a detailed illustration of the earlier figures with the MIPI (e.g., 2701 in FIG. 27, 2601 in FIG. 26, or 2501 in FIG. 25). The RISC-V processor is optional. In a use case without the RISC-V processor, the application processor (not shown in FIG. 28 but see 2506 in FIG. 25) could configure the configurable CNN sub-processor 2802 via of SPI/I2C/UART bus. In such case, the CNN sub-processor output could be read by the application processor or the CNN sub-processor could embed the output on to MIPI frames and then send those to the application processor. In one aspect, with the RISC-V processor, the system becomes more flexible. It can program the PFA/CNN sub-processor 2802 at power on directly from the SPI-FLASH without waiting on the application processor to do the programming. The RISC-V processor, which is an open standard RISC processor, can keep track of the CNN sub-processor states and can even be used for computation purposes if needed. It can also be used for testing of the CNN processor 2801 and the overall chip.

Figure 29:
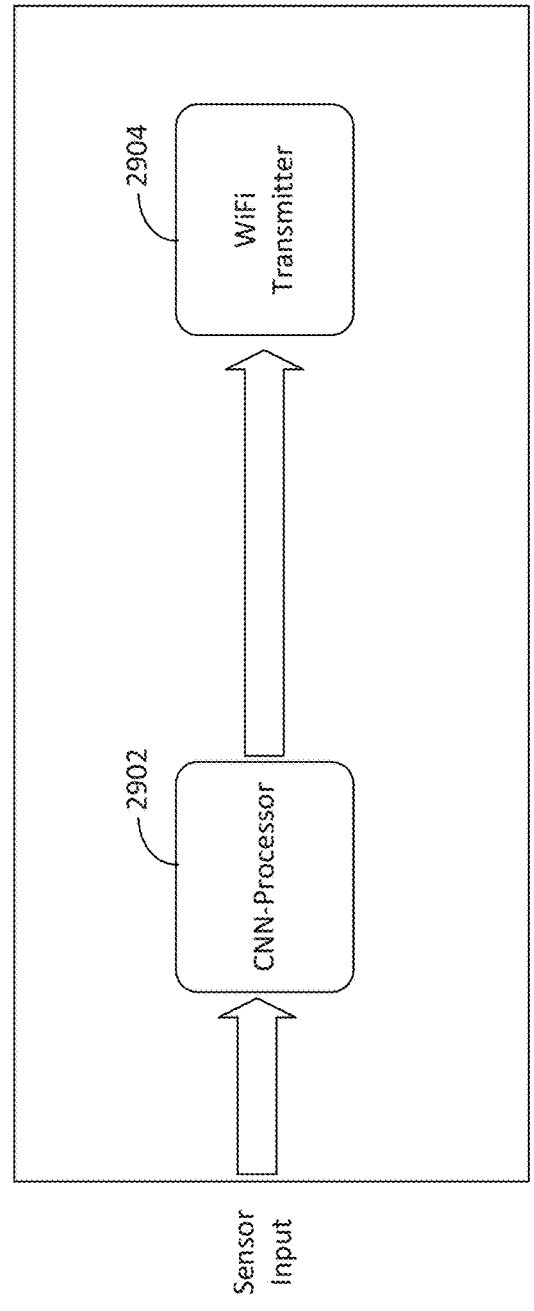
FIG. 29 is a block diagram illustrating a fifth use case of a configurable CNN processor in a direct sensor interface application in accordance with some aspects of the disclosure.

FIG. 29 is a block diagram illustrating a fifth use case 2900 of a configurable CNN processor 2902 in a direct sensor interface application in accordance with some aspects of the disclosure. In FIG. 29, the fifth use case directly processes sensor data using the configurable CNN processor 2902. The MIPI interface, a sub-component of the CNN processor 2902, to the sensor helps achieve that. FIG. 29 shows an example use case where the CNN processor 2902 directly interfaces with a camera sensor module to generate image/video analytics that are directly transmitted over a WiFi transmitter 2904. The image/video analytics computed (e.g., output which may be classification data based on image data from the sensor) is significantly (e.g., orders of magnitude) smaller than the input data and is transmitted over WiFi. This significantly lowers power consumption and improves battery life for the direct sensor interface device, where the device could remain usable for months before recharging any device power source (e.g., battery). The other advantage of this unit is that the CNN processor doesn't need to store the entire frame for processing the image, and it does not need to store the actual image in any digital form. It only transmits the computed statistics over WiFi. Such a device may avoid potential conflicts with privacy laws as it does not record any image or video on any media.

In one aspect, the device could only transmit over WiFi when the processed data is relevant, and that transmission might only include the intended statistics (e.g., a few datawords), thereby reducing the overall transmission bandwidth. Thus, this use case and/or implementation may enable thousands of devices to be connected over WiFi, and as a result, large scale deployment becomes easy, possible, and implementable at a lower cost.

In one aspect, the WiFi transmitter 2904 can be replaced by a more generic wireless transmitter supporting any one of the numerous wireless protocols available for wireless communication. In such case, any of the communications described above as using WiFi can be instead performed wirelessly using any of the wireless protocols other than WiFi.

Figure 30:
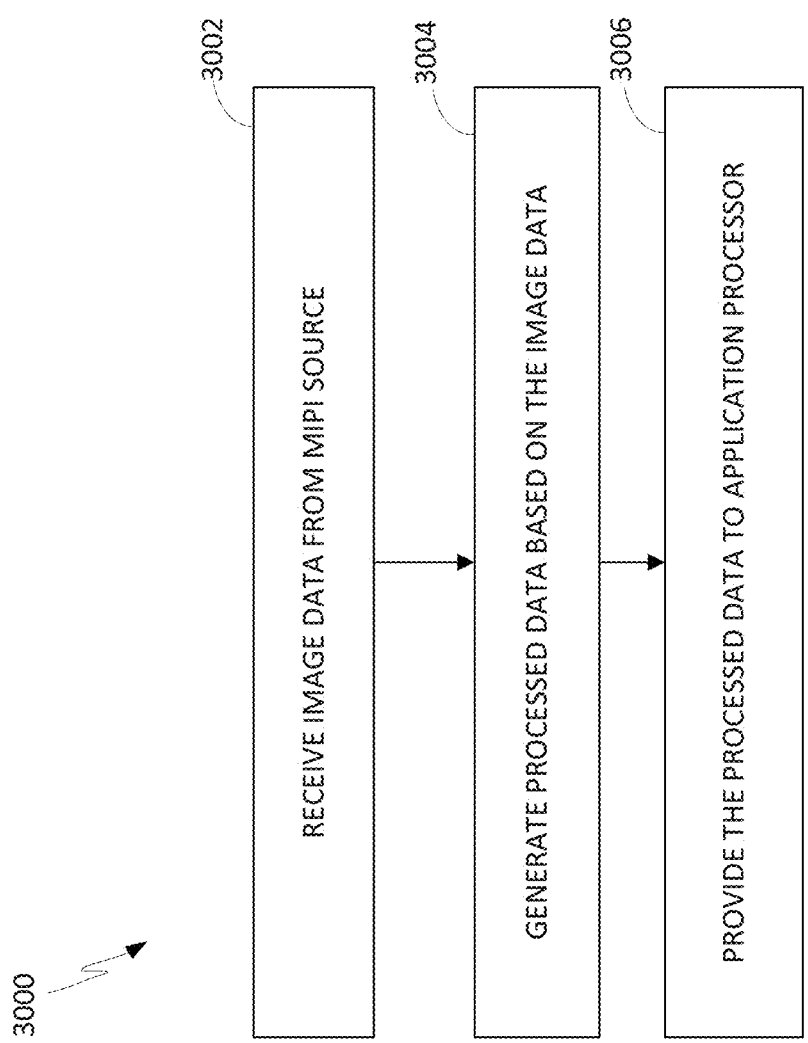
FIG. 30 is a flow chart illustrating a process for operating a configurable CNN processor in a MIPI application in accordance with some aspects of the disclosure.

FIG. 30 is a flow chart illustrating a process 3000 for operating a configurable CNN processor in a MIPI application in accordance with some aspects of the disclosure. In one aspect, any of the configurable CNN processors configured for MIPI (e.g., 2501, 2601, 2701, 2801, or 2901) can perform this process. In block 3002, the process receives image data (e.g., from the image camera sensor 2504 via MIPI in FIG. 25). In block 3004, process generates processed data based on the image data. The processed data can take the form of analytics or other statistics (e.g., including classification data based on the image data). In block 3006, process provides the processed data to an application processor (e.g., on the MIPI bus or on the SPI/I2C/UART bus), or another MIPI sink.

Additional Aspects

In one aspect, the configurable CNN processors described herein can provide various benefits. For example, the interface between the active memory buffer and the core compute elements can be highly elastic and controlled by FIFOs. This allows for each of these modules to run asynchronously to each other without affecting its operations. Each of these FIFOs can be of shallow depth, typically on the order of 8 to 16 word depth. Each of the core compute elements, as a result, may not use any sizeable local memory other than the input and output FIFOs and pipeline registers. This is possible because data flow across the core compute elements and the active memory buffer may be statically defined at compile time. The ability to have different components within a processor subsystem interact asynchronously helps eliminate issues such as timing closure within the chip design and helps save overall power by removing the need for expensive power-hungry clock buffers (e.g., all over the place) at the chip top level to close timing.

Another benefit to the configurable CNN processors described herein involves the active/intelligent memory buffer. In one aspect, it has input and output FIFOs of shallow depth, and the only large memory of the system is its internal memory array, which can be a single contiguous memory and include multiple ports. In one example, the contiguous memory is a two ported contiguous memory array. Using such a sizeable contiguous memory array only in one place helps close timing at the chip top-level and aids in overall chip design.

Another benefit to the configurable CNN processors described herein involves the versatility. For example, when a dataflow graph for a given CNN will not fit in a single chip, the data flow graph can be split and implemented across multiple chips. The communication across multiple chips is made possible by connecting the output of the active memory buffer in a first chip across the chip boundary to the input of active memory buffer in a second chip. Due to the elastic FIFOs present at the output and input ports of the memory buffer, the implementation of the inter-chip communication becomes very flexible and can be implemented by either a serial or parallel interface.

In one aspect, multiple CNNs can be implemented on a configurable CNN processor, as described herein, in parallel. In one aspect, the implementation is not restricted to the number of CNNs to be implemented, but rather the restriction may be on the total resources available for implementing multiple CNNs in parallel.

In one aspect, the input/preselected CNN or CNN description is provided in Python, which is a high-level programming language, and the compiler generates appropriate configuration for the configurable CNN processor.

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A configurable processor dedicated to implementing convolution neural networks (CNNs) and implemented in a single integrated circuit die, comprising:
   a plurality of core compute circuits on the die, each configured to perform a CNN function in accordance with a preselected dataflow graph;
   an active memory buffer on the die;
   a plurality of connections, on the die, between the active memory buffer and the plurality of core compute circuits, each established in accordance with the preselected dataflow graph; and
   a plurality of connections, on the die, between the plurality of core compute circuits, each established in accordance with the preselected dataflow graph,
   wherein the active memory buffer on the die is configured to store data from, and move data between, the plurality of core compute circuits in accordance with the preselected dataflow graph,
   wherein each of the plurality of core compute circuits is configured to perform the CNN function in accordance with the preselected dataflow graph and without using an instruction set, and
   wherein the active memory buffer is further configured to apply backpressure on a data generation source.

2. The configurable processor of claim 1, wherein the preselected dataflow graph is based on a preselected CNN.

3. The configurable processor of claim 1, wherein at least two of the plurality of core compute circuits are configured to operate asynchronously from one another.

4. The configurable processor of claim 1, wherein the active memory buffer and each of the plurality of core compute circuits are configured to operate asynchronously from one another.

5. The configurable processor of claim 1, wherein each of the plurality of core compute circuits is dedicated to performing the CNN function.

6. The configurable processor of claim 1, wherein each of the plurality of core compute circuits is configured, prior to a runtime of the configurable processor, to perform the CNN function.

7. The configurable processor of claim 1, wherein each of the plurality of core compute circuits is configured to compute a layer of the CNN function.

8. The configurable processor of claim 1, wherein each of the plurality of core compute circuits is configured to compute an entire CNN.

9. The configurable processor of claim 1, wherein each of the plurality of core compute circuits is configured to perform the CNN function for both inference and training.

10. The configurable processor of claim 1, wherein each of the plurality of core compute circuits comprises a memory configured to store a weight used to perform the CNN function.

11. The configurable processor of claim 1:
    wherein the plurality of connections between the active memory buffer and the plurality of core compute circuits are established during a compile time and fixed during a runtime of the configurable processor; and
    wherein the plurality of connections between the plurality of core compute circuits are established during the compile time and fixed during the runtime.

12. A processor array, comprising:
    a plurality of the configurable processors of claim 1;
    an interconnect circuitry; and
    a plurality of connections between the plurality of configurable processors and/or the interconnect circuitry, each established in accordance with the preselected dataflow graph.

13. A system comprising:
    a mobile industry processor interface camera serial interface (MIPI-CSI) source;
    a MIPI-CSI sink;
    a MIPI-CSI bus coupled between the MIPI-CSI source and the MIPI-CSI sink; and
    the configurable processor of claim 1 disposed serially along the MIPI-CSI bus such that all data on the MIPI-CSI bus passes through the configurable processor.

14. The system of claim 13, further comprising:
    a non-MIPI-CSI output interface comprising at least one of a SPI, an I2C interface, or a UART interface; and
    wherein the configurable processor is configured to send information to an external device using either the non-MIPI-CSI output interface or the MIPI-CSI bus.

15. A system comprising:
a sensor configured to generate sensor data;
the configurable processor of claim 1 directly coupled to the sensor and configured to generate processed data based on the sensor data; and
a wireless transmitter directly coupled to the configurable processor and configured to transmit at least a portion of the processed data.

16. The system of claim 15:
wherein the sensor data comprises image data;
wherein the processed data comprises classification data generated based on the image data; and
wherein the wireless transmitter is configured to transmit the classification data.

17. A method for configuring a configurable processor dedicated to implementing convolution neural networks (CNNs), comprising:
receiving a preselected dataflow graph;
programming, prior to a runtime of the configurable processor, each of a plurality of core compute circuits of the configurable processor to perform a CNN function in accordance with the preselected dataflow graph;
programming, prior to the runtime, an active memory buffer of the configurable processor in accordance with the preselected dataflow graph;
programming a plurality of connections, of the configurable processor prior to the runtime, between the active memory buffer and the plurality of core compute circuits in accordance with the preselected dataflow graph;
programming a plurality of connections, of the configurable processor prior to the runtime, between the plurality of core compute circuits in accordance with the preselected dataflow graph;
programming, prior to the runtime, the active memory buffer to move data between the plurality of core compute circuits via the memory buffer in accordance with the preselected dataflow graph and to apply backpressure on a data generation source; and
operating the plurality of core compute circuits, at the runtime, to perform the CNN function without using an instruction set.

18. The method of claim 17, further comprising operating the active memory buffer, at the runtime, without using an instruction set.

19. The method of claim 17, wherein the preselected dataflow graph is based on a preselected CNN.

20. The method of claim 17, further comprising operating at least two of the plurality of core compute circuits asynchronously from one another.

21. The method of claim 17, further comprising operating the active memory buffer and each of the plurality of core compute circuits asynchronously from one another.

22. The method of claim 17, wherein each of the plurality of core compute circuits is dedicated to performing the CNN function.

23. The method of claim 17, further comprising:
performing, during the runtime, the CNN function at each of a respective one of the plurality of core compute circuits.

24. The method of claim 17, further comprising:
computing, during the runtime, a layer of the CNN function at each of a respective one of the plurality of core compute circuits.

25. The method of claim 17, further comprising:
computing, during the runtime, an entire CNN at least one of the plurality of core compute circuits.

26. The method of claim 17:
wherein the plurality of connections between the active memory buffer and the plurality of core compute circuits are programmed during a compile time and fixed during the runtime; and
wherein the plurality of connections between the plurality of core compute circuits are programmed during the compile time and fixed during the runtime.

27. The method of claim 17, wherein each of the plurality of core compute circuits is configured to perform the CNN function for both inference and training.

28. The method of claim 17, wherein each of the plurality of core compute circuits comprises a memory configured to store a weight used to perform the CNN function.

29. A configurable processor dedicated to implementing convolution neural networks (CNNs) and implemented in a single integrated circuit die, comprising:
a plurality of means, on the die, for performing a CNN function in accordance with a preselected dataflow graph;
a means, on the die, for storing data;
a means, on the die, for establishing connections between the means for storing data and the plurality of means for performing the CNN function, in accordance with the preselected dataflow graph; and
a means, on the die, for establishing connections between the plurality of means for performing the CNN function, in accordance with the preselected dataflow graph,
wherein the means for storing data comprises a means for moving data between the plurality of means for performing the CNN function via the means for storing data in accordance with the preselected dataflow graph,
wherein each of the plurality of means for performing the CNN function is configured to perform the CNN function in accordance with the preselected dataflow graph and without using an instruction set, and
wherein the means for storing data is configured to apply backpressure on a data generation source.

30. A configurable processor dedicated to implementing convolution neural networks (CNNs), comprising:
a mobile industry processor interface camera serial interface (MIPI-CSI) input circuitry configured to be directly coupled to a MIPI-CSI source circuitry;
a MIPI-CSI output circuitry configured to be directly coupled to an application processor;
a MIPI-CSI bus coupled between the MIPI-CSI input circuitry and the MIPI-CSI output circuitry; and
a configurable CNN sub-processor implemented in a single integrated circuit die and disposed serially along the MIPI-CSI bus such that all data on the MIPI-CSI bus passes through the configurable processor, the configurable CNN sub-processor configured to:
receive image data from the MIPI-CSI source;
generate processed data based on the image data and without using an instruction set; and
provide the processed data to the application processor,
wherein the configurable CNN sub-processor comprises:
a plurality of core compute circuits on the die, each configured to perform a CNN function in accordance with a preselected dataflow graph; and
an active memory buffer on the die, wherein the active memory buffer on the die is configured to:
store data from, and move data on the die between the plurality of core compute circuits via the active memory buffer in accordance with the preselected dataflow graph; and
apply backpressure on a data generation source.

31. The configurable processor of claim 30, wherein the configurable CNN sub-processor is further configured to generate the processed data based on the image data using a preselected CNN.

32. The configurable processor of claim 30, wherein the configurable CNN sub-processor comprises a plurality of the configurable CNN sub-processors in a cascade configuration.

33. The configurable processor of claim 30, wherein the configurable CNN sub-processor is configured to provide the processed data to the application processor via the MIPI-CSI bus.

34. The configurable processor of claim 30, wherein the configurable CNN sub-processor further comprises:
- a plurality of connections, on the die, between the active memory buffer and the plurality of core compute circuits, each established in accordance with the preselected dataflow graph; and
- a plurality of connections, on the die, between the plurality of core compute circuits, each established in accordance with the preselected dataflow graph.

35. The configurable processor of claim 30, further comprising:
- a non-MIPI-CSI output interface comprising at least one of a SPI, an I2C interface, or a UART interface; and
- wherein the configurable processor is configured to send information to the application processor using either the non-MIPI-CSI output interface or the MIPI-CSI bus.

36. The configurable processor of claim 1:
- wherein each of the plurality of core compute circuits configured to perform the CNN function in accordance with the preselected dataflow graph is further configured to generate intermediate results associated with performance of the CNN function; and
- wherein the intermediate results are stored on the die and not in an external memory.

37. The configurable processor of claim 1, wherein each of the plurality of core compute circuits are configured with a static configuration during a compile time of the configurable processor such that the static configuration does not change during a runtime of the configurable processor.

38. The configurable processor of claim 30, wherein the active memory buffer comprises two or more ports configured to operate asynchronously from one another.

39. The configurable processor of claim 1, wherein the active memory buffer comprises two or more ports configured to operate asynchronously from one another.

* * * * *